US008671509B2

(12) United States Patent
Reed et al.

(10) Patent No.: US 8,671,509 B2
(45) Date of Patent: *Mar. 18, 2014

(54) BATTERY POWERED CORDLESS CLEANING SYSTEM

(75) Inventors: Brett Reed, Alliance, OH (US); Markus Allemann, Chagrin Falls, OH (US); Doug Rukavina, Massillon, OH (US); Mark Reindle, Sagamore Hills, OH (US); Norm Siegel, Mentor, OH (US); Jack W. Gee, II, Willoughby, OH (US); Jamie Horvath, Lakewood, OH (US); Mark Butts, Akron, OH (US)

(73) Assignee: Techtronic Floor Care Technology Limited, Tortola (VG)

( * ) Notice: Subject to any disclaimer, the term of this patent is extended or adjusted under 35 U.S.C. 154(b) by 0 days.

This patent is subject to a terminal disclaimer.

(21) Appl. No.: 13/594,394

(22) Filed: Aug. 24, 2012

(65) Prior Publication Data
US 2012/0317743 A1 Dec. 20, 2012

Related U.S. Application Data

(60) Division of application No. 12/580,878, filed on Oct. 16, 2009, which is a continuation-in-part of application No. 12/405,033, filed on Mar. 16, 2009, and a continuation-in-part of application No. 29/326,368, filed on Oct. 16, 2008, now Pat. No. Des. 652,377, and a continuation-in-part of application No. 29/326,362, filed on Oct. 16, 2008, now Pat. No. Des. 615,717, and a continuation-in-part of application No. 29/362,364, filed on Oct. 16, 2008, now abandoned.

(60) Provisional application No. 61/036,720, filed on Mar. 14, 2008, provisional application No. 61/105,891, filed on Oct. 16, 2008, provisional application No. 61/105,899, filed on Oct. 16, 2008, provisional application No. 61/105,896, filed on Oct. 16, 2008.

(51) Int. Cl.
A47L 9/28 (2006.01)

(52) U.S. Cl.
USPC .......................................................... 15/328

(58) Field of Classification Search
USPC ................................... 15/328, 329, 352, 412
See application file for complete search history.

(56) References Cited

U.S. PATENT DOCUMENTS

| | | | |
|---|---|---|---|
| 4,632,201 A | 12/1986 | Kay | |
| 4,835,409 A | 5/1989 | Bhagwat et al. | |

(Continued)

FOREIGN PATENT DOCUMENTS

| | | |
|---|---|---|
| EP | 0523891 | 1/1993 |
| EP | 0533897 | 3/1993 |

(Continued)

OTHER PUBLICATIONS

Westinghouse Vacuum and Battery & Charger photographs, Photos of Battery Pack, Vacuum, Claims, Front View, Side View, Rear View, Charger, Battery Back, and Battery Front, 4 pages, available at least as early as Jul. 9, 2009.

(Continued)

Primary Examiner — Robert Scruggs
(74) Attorney, Agent, or Firm — Michael Best & Friedrich LLP

(57) ABSTRACT

A cordless, battery-powered system of cleaning products. The system of cleaning products includes devices such as upright vacuums (e.g., a stick vacuum, a lightweight upright vacuum, etc.), a hand-held vacuum, a carpet-cleaner, a canister vacuum, and the like. Each of the devices is powered by a battery pack which is interchangeable among the devices. The battery pack includes a combination of hardware and software for connecting to, identifying, and communicating with the cleaning products to ensure that each of the products receives the power necessary to ensure optimal performance.

36 Claims, 22 Drawing Sheets

(56) References Cited

U.S. PATENT DOCUMENTS

| | | | |
|---|---|---|---|
| 5,004,276 A | 4/1991 | Hanley | |
| 5,014,388 A | 5/1991 | Schiazza et al. | |
| 5,101,532 A | 4/1992 | Dyson et al. | |
| 5,101,534 A | 4/1992 | Watanabe et al. | |
| 5,435,031 A * | 7/1995 | Minami et al. | 15/1.7 |
| 5,504,412 A * | 4/1996 | Chan et al. | 15/339 |
| 5,513,418 A | 5/1996 | Weber | |
| 5,605,493 A | 2/1997 | Donatelli et al. | |
| 5,771,448 A | 6/1998 | Cooper | |
| 5,899,763 A | 5/1999 | Kajiura | |
| 6,181,032 B1 | 1/2001 | Marshall et al. | |
| 6,311,366 B1 * | 11/2001 | Sepke et al. | 15/412 |
| 6,457,205 B1 * | 10/2002 | Conrad | 15/412 |
| 6,526,622 B2 | 3/2003 | Conrad | |
| 6,664,748 B2 | 12/2003 | Kushida et al. | |
| 6,839,934 B2 | 1/2005 | Houghton et al. | |
| 6,965,213 B2 | 11/2005 | Schadoffsky et al. | |
| 7,014,949 B2 | 3/2006 | Kanai et al. | |
| 7,100,234 B2 | 9/2006 | Weber et al. | |
| 7,120,965 B2 | 10/2006 | Hisano et al. | |
| 7,163,372 B2 | 1/2007 | Kegg | |
| 7,205,745 B2 | 4/2007 | Murashige et al. | |
| 7,356,873 B2 | 4/2008 | Nielsen | |
| 7,653,963 B2 | 2/2010 | Cochran et al. | |
| 2003/0134189 A1 | 7/2003 | Kanai et al. | |
| 2003/0201754 A1 | 10/2003 | Conrad | |
| 2004/0088817 A1 | 5/2004 | Cochran et al. | |
| 2004/0134026 A1 | 7/2004 | Brinkhoff et al. | |
| 2005/0017681 A1 | 1/2005 | Ogishima et al. | |
| 2005/0236012 A1 | 10/2005 | Josefsson et al. | |
| 2006/0137133 A1 | 6/2006 | Yik et al. | |
| 2007/0209138 A1 | 9/2007 | Tran et al. | |
| 2007/0226946 A1 * | 10/2007 | Best | 15/329 |
| 2008/0047094 A1 | 2/2008 | Ha et al. | |
| 2008/0086833 A1 | 4/2008 | Capron-Tee | |
| 2008/0155768 A1 | 7/2008 | Ziegler et al. | |
| 2008/0250570 A1 | 10/2008 | Dayton et al. | |
| 2009/0255084 A1 | 10/2009 | Gee, II et al. | |

FOREIGN PATENT DOCUMENTS

| | | |
|---|---|---|
| EP | 1310203 | 5/2003 |
| EP | 1752076 | 2/2007 |
| GB | 2433424 | 6/2007 |
| GB | 2442033 | 3/2008 |
| WO | 92/17117 | 10/1992 |
| WO | 2007117196 | 10/2007 |
| WO | 2008027315 | 3/2008 |

OTHER PUBLICATIONS

Karcher, BV 5/1 Bp, Cordless Brooms, available online at: <http://www.karcher.com/int/Products/Professional/Vacuums/Cordless_brooms/13942020.htm> (get PDF), Alfred Karcher GmbH & Co. KG, 2009.

Karcher, T 9/1 Bp, Cordless Brooms, available online at: <http://www.karcher.com/int/Products/Professional/Vacuums/Cordless_brooms/15281010.htm> (get PDF), Alfred Karcher GmbH & Co. KG, 2009.

Black & Decker VPX Hand Vac Reviews—Walmart.com, available online at: <http://www.walmart.com/catalog/a11Reviews.do?product_id=7081183>, available at least as early as Jul. 1, 2009.

Black & Decker VPX 7V Lithium-Ion Battery—VPX0111, BDOnline Store, available online at: <http://www.bdonlinestore.com/product_detail.asp?HDR=& T1=BDT+VPX0111>, available at least as early as Jul. 1, 2009.

Black & Decker Power Tools, 18 Volt Platinum Series Cordless Hand Vac, available online at: <http://www.blackanddecker.com/ProductGuide/Product-Details.aspx?ProductID=14861>, available at least as early as Jul. 1, 2009.

Westinghouse, WST1600 Series Cord-Free Vacuum Cleaner, Manual, Salton Inc., 2003.

Ryobi, 18V One+ Hand Vac, Model #: P712, available online at: <http://www.ryobitools.com/catalog/power_tools/specialty_tools/P712>, available at least as early as Jul. 1, 2009.

Ryobi, 18V One+ Wet/Dry Canister Vac, Model #: P3200, available online at: <http://www.ryobitools.com/catalog/power_tools/specialty_tools/P3200>, available at least as early as Jul. 1, 2009.

Ryobi, Lithium Upgrade Kit, Model #: P123, available online at: <http://www.ryobitools.com/catalog/accessories/batteries_chargers/P123>, available at least as early as Jul. 1, 2009.

Ryobi, 18 Volt One+ Battery Pack, Model #: P100, available online at: <http://www.ryobitools.com/catalog/accessories/batteries_chargers/P100>, available at least as early as Jul. 1, 2009.

Eureka, Quick Up 96DZ, Lightweight Vacuums, available online at: <http://www.eureka.com/index.php?option=com_productdisplay&view=productdisplay&task=getproducts&productid=26> available at least as early as Jul. 1, 2009.

Eureka, Quick Up 96F, Lightweight Vacuums, available online at: <http://www.eureka.com/index.php?option=com_productdisplay&view=productdisplay&task=getproducts&productid=27>, available at least as early as Jul. 1, 2009.

Sears, Craftsman C3 19.2 Volt Hand Vac, Item# 00911571000, Model# 11571, available online at: <http://www.sears.com/shc/s/p_10153_12605_00911571000P?keyword=Craftsman+C3+19.2+Volt+Hand+Vac>, available at least as early as Jun. 10, 2009.

Sears, Craftsman C3 19.2 Volt Workshop Blower/Vac, Item#00911592000, Model#11592, available online at: <http://www.sears.com/shc/s/p_10153_12605_00911592000P?keyword=Craftsman+C3+19.2+Volt+Workshop+Blower%2FVac&sLevel=0>, available at least as early as Jun. 10, 2009.

Sears, DiHard C3 19.2 Volt Lithium-Ion Battery Pack, Item# 00911374000, Model# 11374, available online at: <http://www.sears.com/shc/s/p_10153_12605_00911374000P?keyword=DieHard+C3+19.2+Volt+Lithium>, available at least as early as Jun. 10, 2009.

Sears, Craftsman C3 19.2 Volt Lithium-Ion Battery Charger, Item# 00925926000, Model# 25926, available online at: http://www.sears.com/shc/s/p_10153_12605_00925926000P?keyword=Craftsman+C3+1 9.2+Volt+Lithium, available at least as early as Jun. 10, 2009.

Nilfisk, GD911 Battery, 4 pages, available at least as early as Jul. 1, 2009.

* cited by examiner

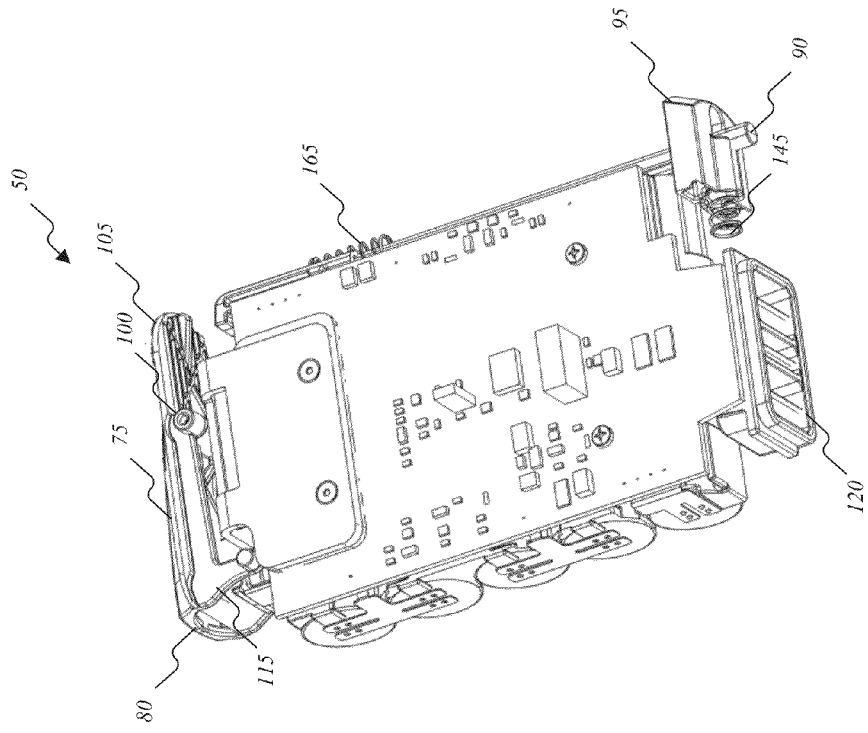
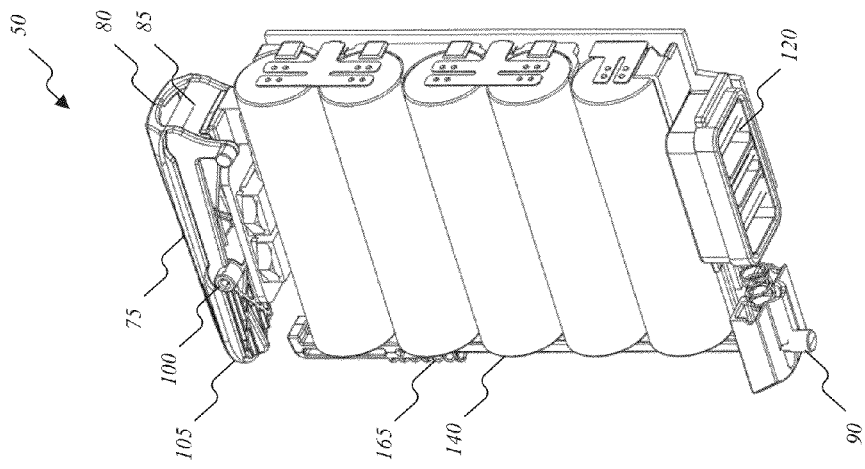

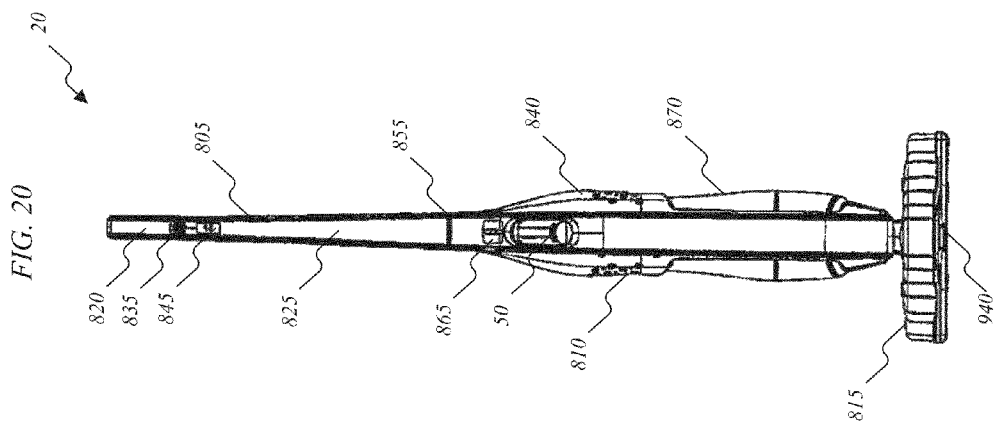
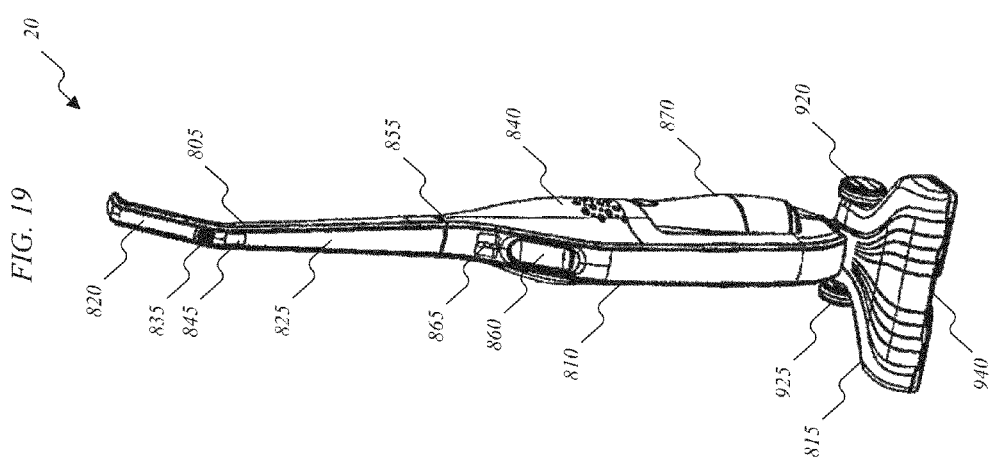

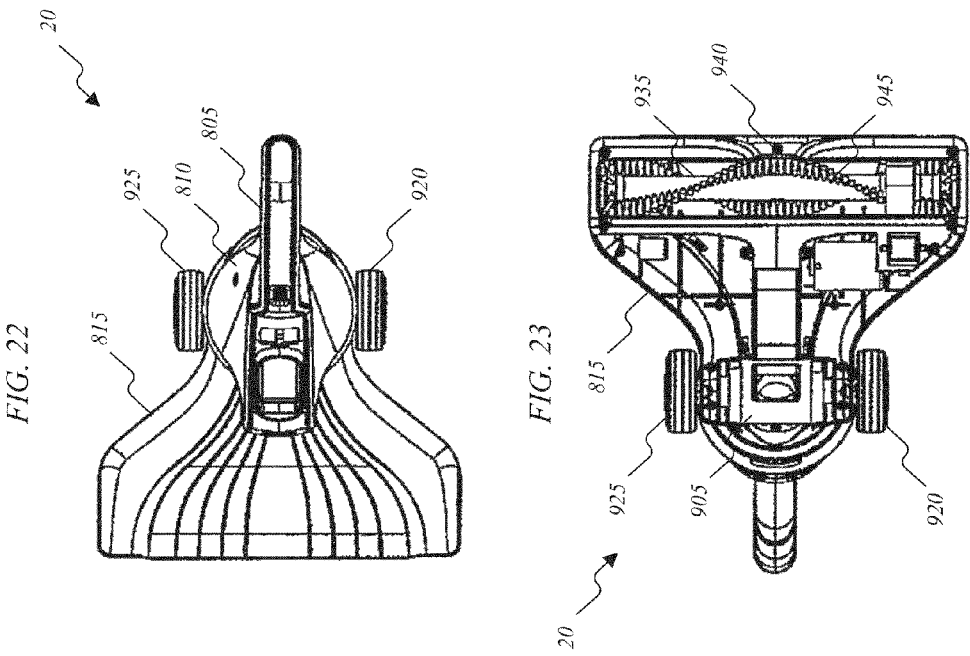
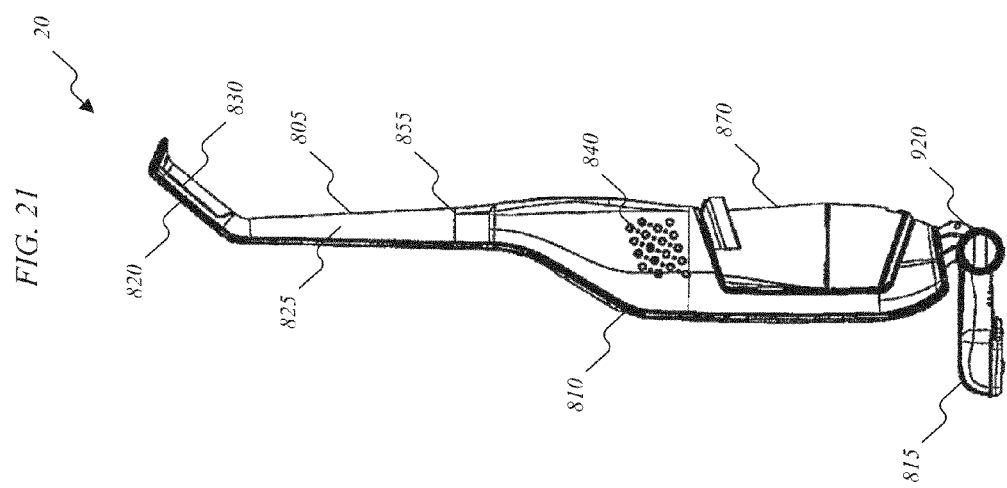

BATTERY POWERED CORDLESS CLEANING SYSTEM

RELATED APPLICATIONS

This application is a division of previously-filed, co-pending U.S. patent application Ser. No. 12/580,878, filed Oct. 16, 2009, which is a continuation-in-part of U.S. patent application Ser. No. 12/405,033, filed Mar. 16, 2009, which claims the benefit of U.S. Provisional Patent Application No. 61/036,720, filed Mar. 14, 2008, the entire contents of all of which are hereby incorporated by reference. U.S. patent application Ser. No. 12/580,878 is also a continuation-in-part of U.S. patent application Ser. No. 29/326,368, filed Oct. 16, 2008, now U.S. Pat. No. D652377, U.S. patent application Ser. No. 29/326,362, filed Oct. 16, 2008, now U.S. Pat. No. D615616, and U.S. patent application Ser. No. 29/326,364, filed Oct. 16, 2008, now abandoned, the entire contents of all of which are hereby incorporated by reference. U.S. patent application Ser. No. 12/580,878 also claims the benefit of previously-filed co-pending U.S. Provisional Patent Application No. 61/105,891, filed Oct. 16, 2008, U.S. Provisional Patent Application No. 61/105,899, filed Oct. 16, 2008, and U.S. Provisional Patent Application No. 61/105,896, filed Oct. 16, 2008, the entire contents of all of which are hereby incorporated by reference.

BACKGROUND

Consumer devices, such as suction force cleaners having both a suction motor and impeller or fan assembly (e.g., vacuum cleaners), have been limited almost exclusively to corded, AC powered devices. The power required to operate such devices is prohibitive to the development of a cordless vacuum cleaner that is able to provide portability, functionality, and adequate suction force. Attempts have been made to incorporate battery packs into vacuum cleaners. Although some of these attempts have succeeded in reducing vacuum cleaners' dependence on AC power, they have been unable to provide a solution that is adequate among multiple types of devices.

SUMMARY

Cleaning systems include a wide range of products designed to meet a wide variety of cleaning needs, and cleaning often requires the use of multiple devices to sufficiently clean a room or space. Large and small cleaning devices alike suffer from a lack of portability and operational congruence. For example, the multiple devices used for cleaning often include an upright suction force cleaner for cleaning large surface areas with a significant amount of debris and a smaller, hand-held cleaning device for cleaning smaller or confined areas. As another example, a canister vacuum is used in combination with an upright cleaning device or a hand-held vacuum. No matter the combination of devices being used, the efficiency, portability, and compatibility associated with using multiple devices is hindered by, among other things, the different power requirements of each device. For example, a hand vacuum, which is typically a battery powered device, requires its own charger or replaceable batteries, and an upright vacuum, which is typically a corded device, requires a user to be within power cord-range of a power outlet.

Embodiments of the invention provide a cordless cleaning system that includes devices such as a stick vacuum, a lightweight upright vacuum, a hand-held vacuum, a carpet-cleaner, a canister vacuum, and the like. Each of the devices is capable of being powered by a single battery pack which is interchangeable among the devices. For example, the battery pack is initially inserted into the stick vacuum, and is then removed and inserted into the hand-held vacuum. The battery pack includes a combination of hardware and software for identifying and communicating with each of the devices to ensure that each of the devices receives the power necessary to ensure optimal performance. The battery pack also includes additional control electronics which maximize the charge-life of the battery pack, allow charging parameters and characteristics to be modified, and ensure an accurate charge determination for both the battery pack as a whole and the individual cells within the battery pack.

In one embodiment, the battery pack is configured to enter a "sleep" mode when not inserted in a battery charger or other valid device (e.g., during a storage period). When in the sleep mode, power consumption of the battery pack is minimized to maintain cell charge. During the sleep mode, the battery pack removes power from its power terminals, and a battery pack control circuit enters a low or reduced power mode to prolong the life of the battery. The battery pack is also configured to enter a "wake" mode when the battery pack is inserted into an electrical device, and a voltage (e.g., a logical high voltage) is applied to a serial communication terminal of the battery pack. If no voltage is applied to the serial communication terminal, the battery pack is configured to wake up from the sleep mode once every 1-2 hours to perform a voltage level check and a battery cell temperature check.

In another embodiment, the battery pack is configured to communicate with devices (e.g., a battery charger, a configuration device, etc.) to adjust or change the charge and/or discharge parameters of the battery pack. Additionally or alternatively, a battery pack controller is configured to store cell-specific operating parameters in a memory, and is capable of adjusting or changing the operating parameters according to information received from the devices.

In yet another embodiment, the battery pack is configured to communicate with a device (e.g., a battery charger, a cleaning device, etc.) which includes a fuel gauge that displays the remaining battery charge capacity of the battery pack. The battery pack stores cell-specific operating parameters in a memory and provides information to the device's fuel gauge that accurately represents the remaining battery charge capacity of the battery pack. The information is based on the operating parameters stored in memory including, among other things, discharge currents, charge currents, and threshold values.

Additionally, the battery pack is operable to provide power to any of a plurality of additional devices. For example, the battery pack is capable of providing power to any number of devices having different voltage and current requirements, such as power tools, test and measurement equipment, outdoor power equipment, and vehicles. Power tools include, for example, drills, circular saws, jig saws, band saws, reciprocating saws, screw drivers, angle grinders, straight grinders, hammers, impact wrenches, angle drills, inspection cameras, and the like. Test and measurement equipment includes digital multimeters, clamp meters, fork meters, wall scanners, IR temperature guns, and the like. Outdoor power equipment includes blowers, chain saws, edgers, hedge trimmers, lawn mowers, trimmers, and the like.

In one embodiment, the invention provides a cordless cleaning system that includes a rechargeable battery pack, a first cordless cleaning device, and a second cordless cleaning device. The rechargeable battery pack includes a housing and at least two cells within the housing. The first cordless cleaning device and the second cordless cleaning device are operable to removably receive and be powered by the battery pack. The first device is a first type of cleaning device, the second device is a second type of cleaning device, and the first type of cleaning device is different than the second type of cleaning device. At least one of the first device and the second device has an upright working position.

In another embodiment, the invention provides a cordless vacuum cleaner. The vacuum cleaner includes a nozzle base portion, a body portion, at least one motor, and a switch. The nozzle base portion includes a suction inlet, and the body portion is operable to receive a lithium-based battery pack that is removably coupled to the vacuum cleaner. The at least one motor is powered by the battery pack and is configured to provide a suction force at the suction inlet. The battery pack is received in a recess positioned above each of the at least one motor. The vacuum cleaner is configured to operate in a first mode and a second mode, and the switch is configured to select the first mode or the second mode to selectively supply power to each of the at least one motor.

In yet another embodiment, the invention provides a cordless vacuum cleaner. The vacuum cleaner includes a nozzle base portion, a body portion, a junction between the nozzle base portion and the body portion, a suction source, and a battery pack interface. The nozzle base portion includes a suction inlet. The suction source provides a suction force at the suction inlet, and the battery pack interface is configured to receive a removable and rechargeable lithium-based battery pack. The suction source is powered by the battery pack, and the battery pack interface is positioned above the suction source. The body portion is also supportable in a vertical position by the junction between the nozzle base portion and the body portion without external support.

Other aspects of the invention will become apparent by consideration of the detailed description and accompanying drawings.

BRIEF DESCRIPTION OF THE DRAWINGS

FIG. 9 is a perspective view of the battery pack of FIG. 2 with the external housing removed.

FIG. 10 is another perspective view of the battery pack of FIG. 2 with the external housing removed.

FIG. 19 is a perspective view of a cleaning device according to an embodiment of the invention.

FIG. 20 is a front view of the cleaning device of FIG. 19.

FIG. 21 is a side view of the cleaning device of FIG. 19.

FIG. 22 is a top view of the cleaning device of FIG. 19.

FIG. 23 is a bottom view of the cleaning device of FIG. 19.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Embodiments of the invention described herein relate to a cordless, battery-powered system of electronic devices, such as a system of cleaning products. The system of cleaning products includes devices such as upright vacuums (e.g., a stick-type vacuum, a lightweight upright vacuum, etc.), a hand-held vacuum, a carpet-cleaner, a canister vacuum, a wet/dry floor cleaner, and the like. Each of the devices is powered by a battery pack which is interchangeable among the devices. The battery pack includes a combination of hardware and software for connecting to, identifying, and communicating with each of the devices to ensure that each of the devices receives the power necessary to ensure optimal performance. For example, the battery pack includes a latch and a rod for removably securing the battery pack to the devices. The battery pack also includes control electronics which maximize the charge-life of the battery pack by operating the battery pack in a "sleep" mode, allow charging parameters and characteristics to be modified, and ensure an accurate battery pack charge determination.

Figure 1:
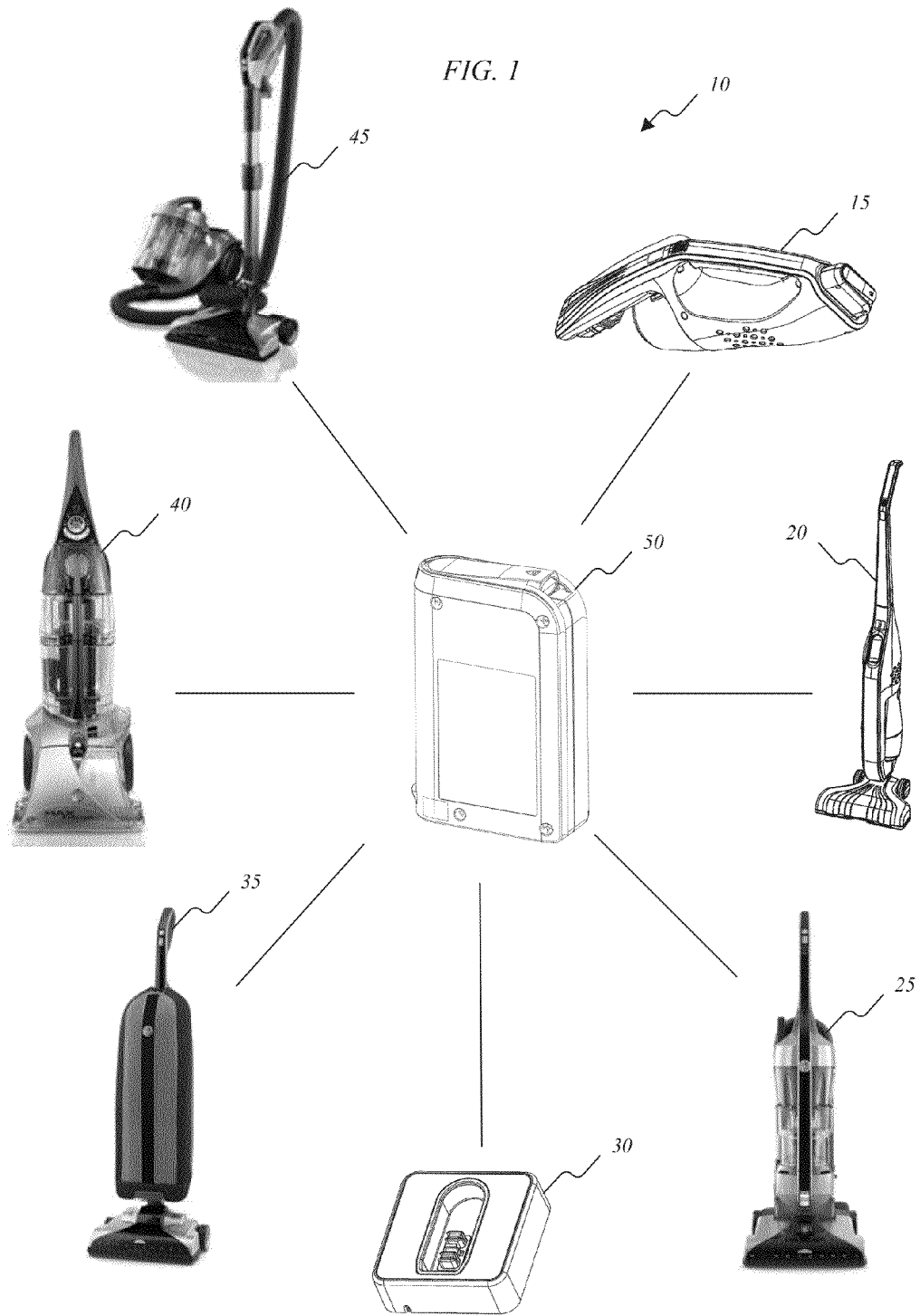
FIG. 1 illustrates a cordless cleaning system according to an embodiment of the invention.
Figure 2:
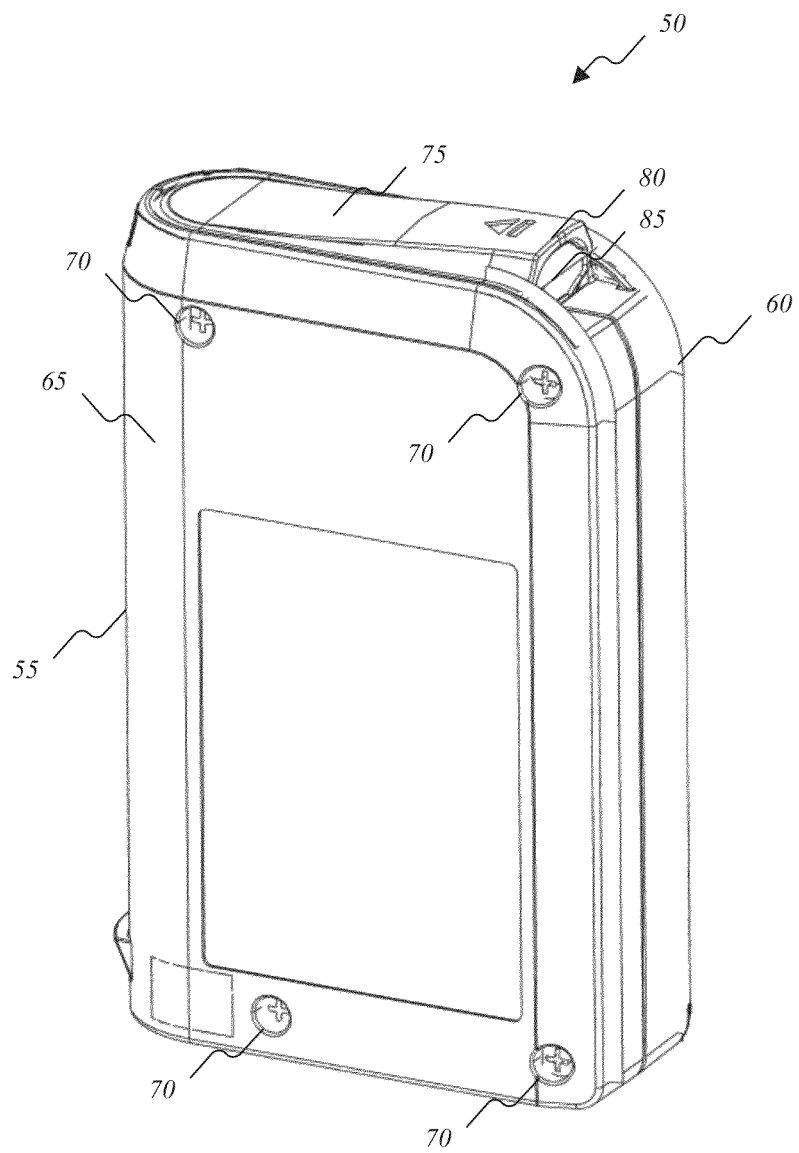
FIG. 2 is a perspective view of a battery pack according to an embodiment of the invention.

FIG. 1 illustrates a cordless cleaning system 10 that includes a hand-held vacuum 15, a stick-type vacuum 20, a bagless upright vacuum 25, a battery charger 30, a bagged upright vacuum 35, a carpet cleaner 40, and a canister vacuum 45. Each of the devices 15-45 is connectable to and powered by a battery pack 50. The battery pack 50 has, for example, a nickel-metal hydride ("NiMH"), nickel-cadmium ("NiCd"), lithium-cobalt ("Li—Co"), lithium-manganese ("Li—Mn"), Li—Mn spinel, or other suitable lithium or lithium-based chemistry. The battery pack 50 has a nominal voltage rating of 4V, 8V, 12V, 16V, 18V, 20V, 24V, 36V, 48V, etc., or any voltage rating therebetween or greater than 48V. Battery cells within the battery pack 50 have capacity ratings of, for example, 1.2 Ah, 1.3 Ah, 1.4 Ah, 2.0 Ah, 2.4 Ah, 2.6 Ah, 3.0 Ah, etc. The individual cell capacity ratings are combined to produce a total battery pack capacity rating, which is based both on the capacity ratings of the individual cells and the number of cells in the battery pack 50. In some embodiments, the individual battery cells have energy densities of 0.348 Wh/cm$^3$, although other energy densities are used in other embodiments. The battery pack 50 is able to provide an overall energy density of, for example, at least 0.084 Wh/cm$^3$.

FIGS. 2-10 illustrate the battery pack 50 in greater detail. The battery pack 50 includes a housing 55 formed of a first half or shell 60 and a second half or shell 65. The first and second shells 60 and 65 are coupled to one another using, for example, screws 70 or other suitable fastening devices or materials. A lever 75 is pivotally mounted to the housing 55, and enables the removal of the battery pack 50 from each of the devices in the cordless cleaning system 10. A first end 80 of the lever 75 is pulled to unlatch or to eject the battery pack 50 from a device. In some embodiments, the first end 80 is formed as a raised portion adjacent to a recess 85. The raised portion of the first end 80 and the recess 85 are sized to receive, for example, a user's finger or another object to pivot the lever 75.

The lever 75 is pivotally mounted to the housing 55. A push rod 90 (FIG. 4) is movably mounted to the housing 55, and is configured to be axially moved by the pivoting motion of the lever 75. A latch 95 is extendable, movably mounted to the housing 55, and configured to be moved from a first position (e.g., a latched position) to a second position (e.g., an unlatched position) by the movement of the push rod 90. While in the latched position, the latch 95 securely couples the battery pack 50 to a device. The movement of the latch 95 from the first position to the second position allows the battery pack 50 to be removed from a device. In the illustrated embodiments, a single latch is provided. In other embodiments, additional latches are provided within a battery pack.

Figure 3:
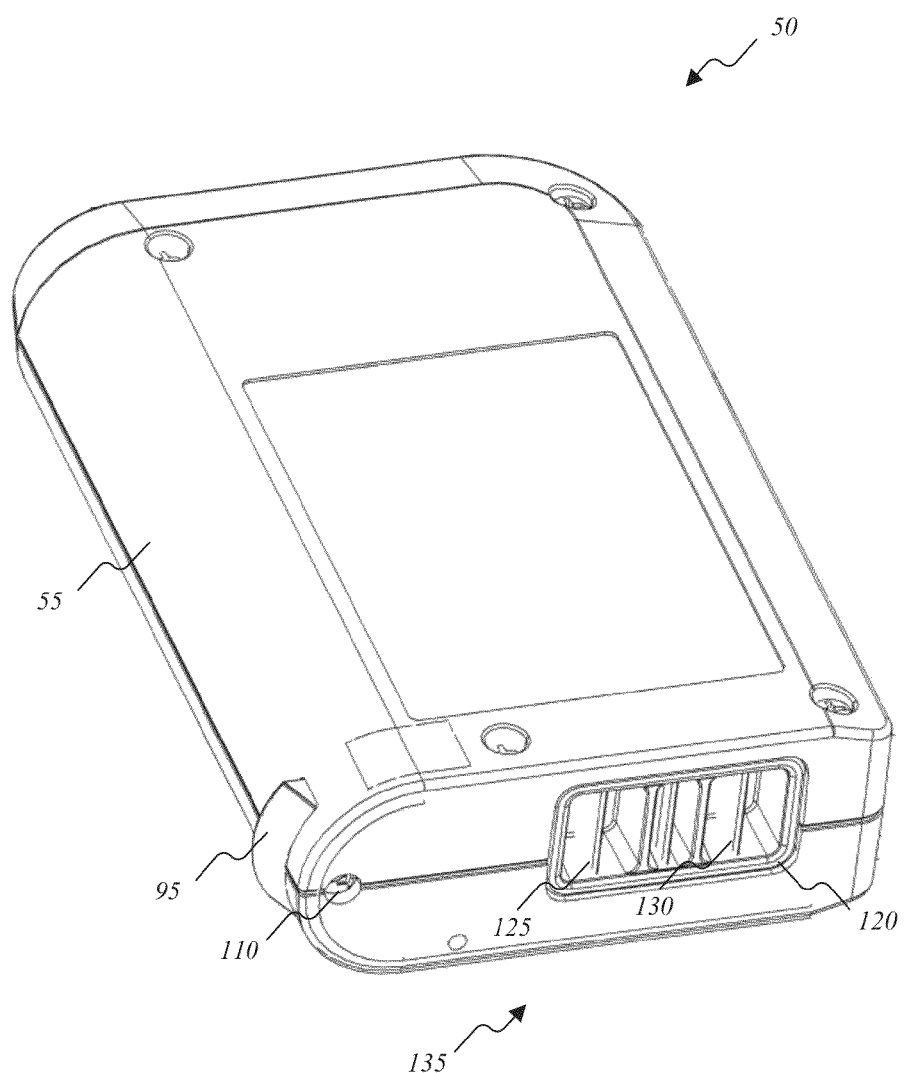
FIG. 3 is another perspective view of the battery pack of FIG. 2.
Figure 5:
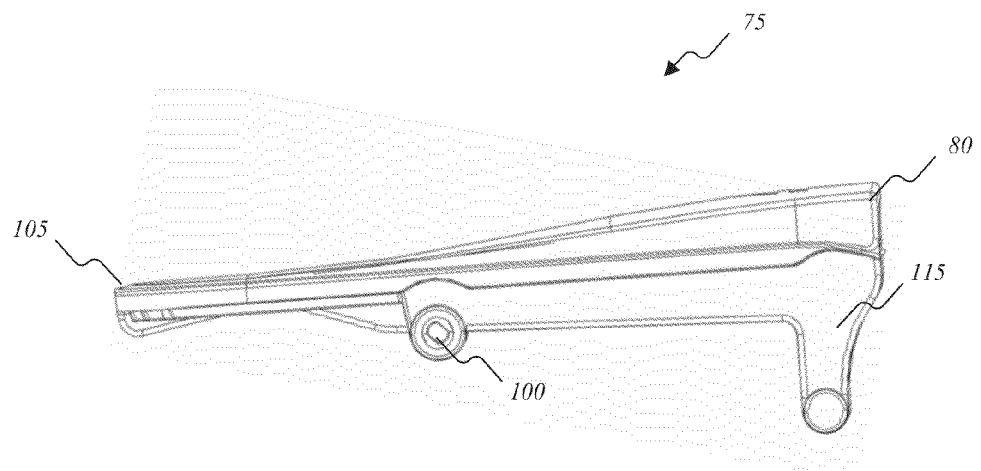
FIG. 5 is a side view of a lever according to an embodiment of the invention.
Figure 6:
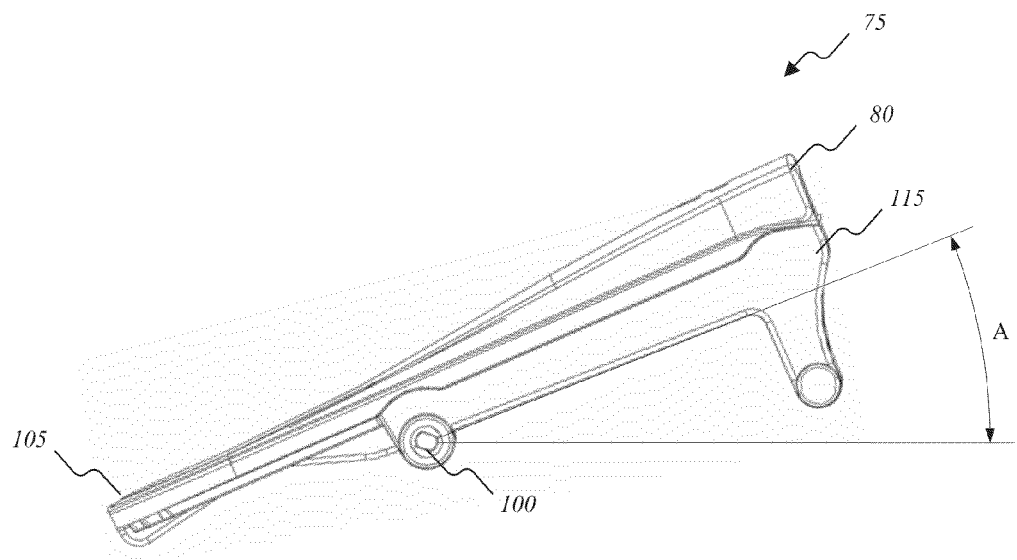
FIG. 6 is another side view of a lever according to an embodiment of the invention.
Figure 8:
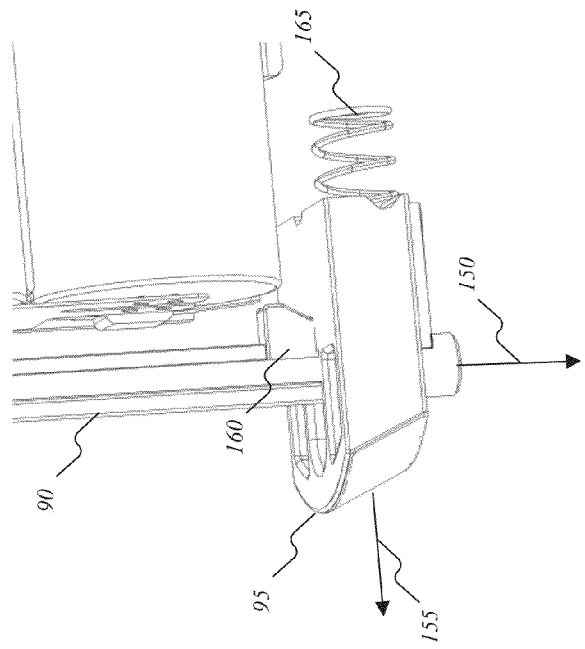
FIG. 8 is a perspective view of a latching mechanism according to an embodiment of the invention.
Figure 7:
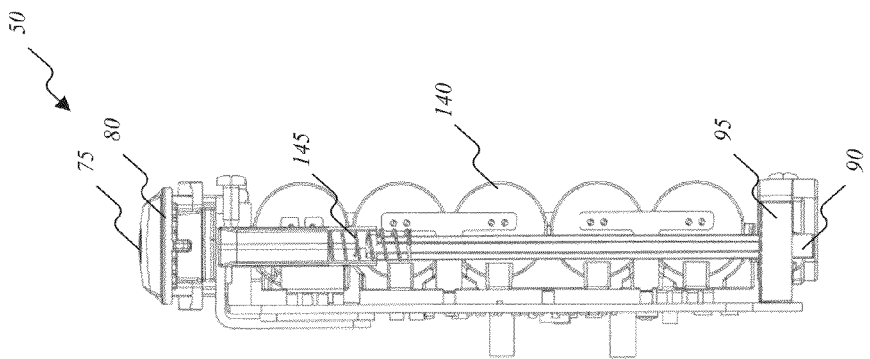
FIG. 7 is a side view of the battery pack of FIG. 2 with an external housing removed.

As illustrated in FIGS. 5 and 6, the lever 75 pivots about a connection point 100. As the first end 80 of the lever 75 is lifted, a second end 105 of the lever 75 is rotated downward and brought into contact with the push rod 90. The pivotal movement of the lever 75 about the connection point 100 is limited to an angle, A, of between, for example, zero and approximately 90 degrees. In some embodiments, the pivotal movement is between approximately zero degrees and approximately 45 degrees. In response to contact from the lever 75, the push rod 90 is moved downward through an aperture 110 (FIG. 3). In some embodiments, the lever 75 also includes legs 115 which extend from the first end 80, and work in conjunction with the housing 55 to limit the pivotal movement of the lever 75.

Figure 4:
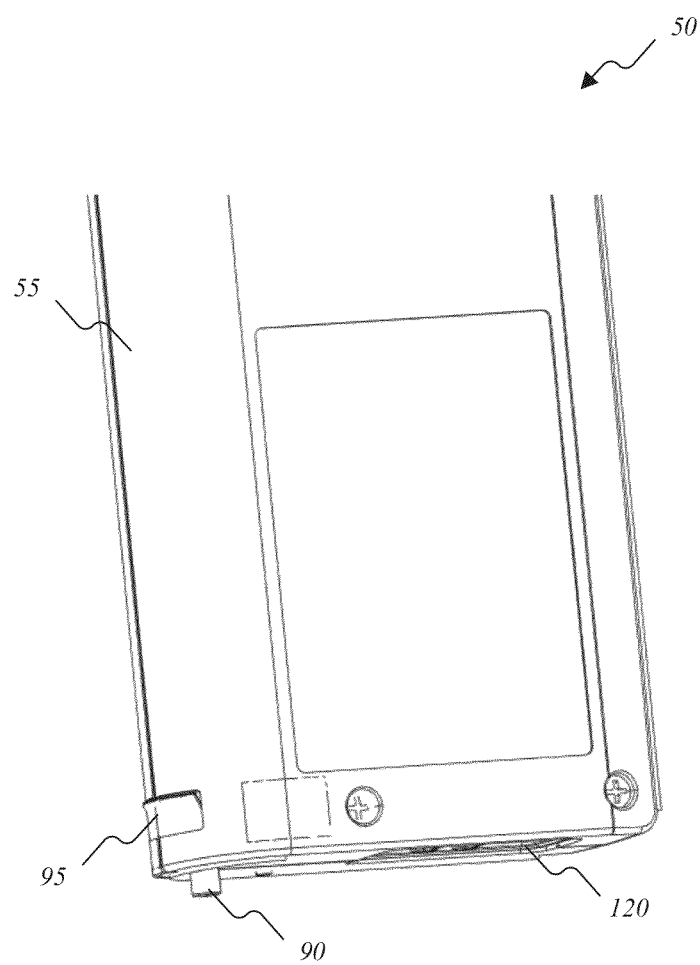
FIG. 4 is a partial perspective view of the battery pack of FIG. 2.

As shown in FIGS. 3 and 4, electrical connections to the battery pack 50 are made through an interface 120, which is slightly recessed within the housing 55. Electrical connectors 125 and 130 are located on a bottom side 135 of the housing 55 and are adjacent to a supporting structure, which protects the electrical connectors 125 and 130 within the interface 120.

FIGS. 7-10 illustrate the battery pack 50 with the housing 55 removed. The battery pack 50 includes one or more battery cells 140 positioned within the housing 55. The push rod 90 is movable between a first position (e.g., a retracted position) and a second position (e.g., a protruded position). While in the retracted position, the push rod 90 is retracted within the housing 55. While in the protruded position, the push rod 90 extends from the housing 55 through the aperture 110. When the push rod 90 is extended through the aperture 110, the force of the push rod 90 extending through the aperture 110 assists in the removal of the battery pack 50 from a device.

A biasing element, such as a spring 145, biases the push rod 90 toward the retracted position. When the first end 80 of the lever 75 is pulled, the push rod 90 is driven downward against the biasing force of the spring 145 to move the latch 95 from the latched position to the unlatched position. When the lever 75 is moved through a sufficient angular distance, the latch 95 is moved from the latched position to the unlatched position, and the push rod 90 is moved from the retracted position to the protruded position.

The movement of the push rod 90 occurs along a first axis 150, and movement of the latch 95 between the latched position and the unlatched position occurs along a second axis 155. In some embodiments, the second axis 155 is oriented approximately normal to the first axis 150. The push rod 90 and the latch 95 are then connected to, coupled to, or in contact with one another in a manner such that a movement of the push rod 90 along the first axis 150 is translated to a movement of the latch 95 along the second axis 155. In one embodiment, the push rod 90 includes a tapered portion 160 which engages a tapered portion of the latch 95 upon movement of the push rod 90.

To secure the battery pack 50 to a device, the latch 95 is biased into the latched position by a biasing element, such as the spring 165. The movement of the push rod 90 forces the latch 95 into the unlatched position by overcoming the biasing force from the biasing element 165. For example, the push rod 90 causes the latch 95 to move into the unlatched position from the latched position when the push rod 90 is moved a sufficient distance (e.g., when the lever 75 is pivotally moved through a sufficient angular distance). Additionally or alternatively, inserting the battery pack 50 into a device forces the latch 95 against the biasing element 165 and into the unlatched position. The latch 95 returns to the latched position when the battery pack 50 is fully inserted into the device.

The battery cells 140 are electrically connected in series and are physically connected such that the cells 140 are parallel to one another and aligned in a single row. In other embodiments, one or more additional series-connected groups of battery cells are connected in parallel with the battery cells 140. The interface 120 is also aligned with the cells 140 at the bottom side 135 of the housing 55 (e.g., a small end of the housing 55). Such an arrangement of the battery cells 140 and the interface 120 allows the heat generated by the cells 140 to be evenly distributed across the battery pack 50. The battery pack 50 is inserted into a recess of a device with the bottom side 135 of the housing 55 first, and in some embodiments, more than half of a volume of the battery pack 50 is inserted into the recess.

Figure 11:
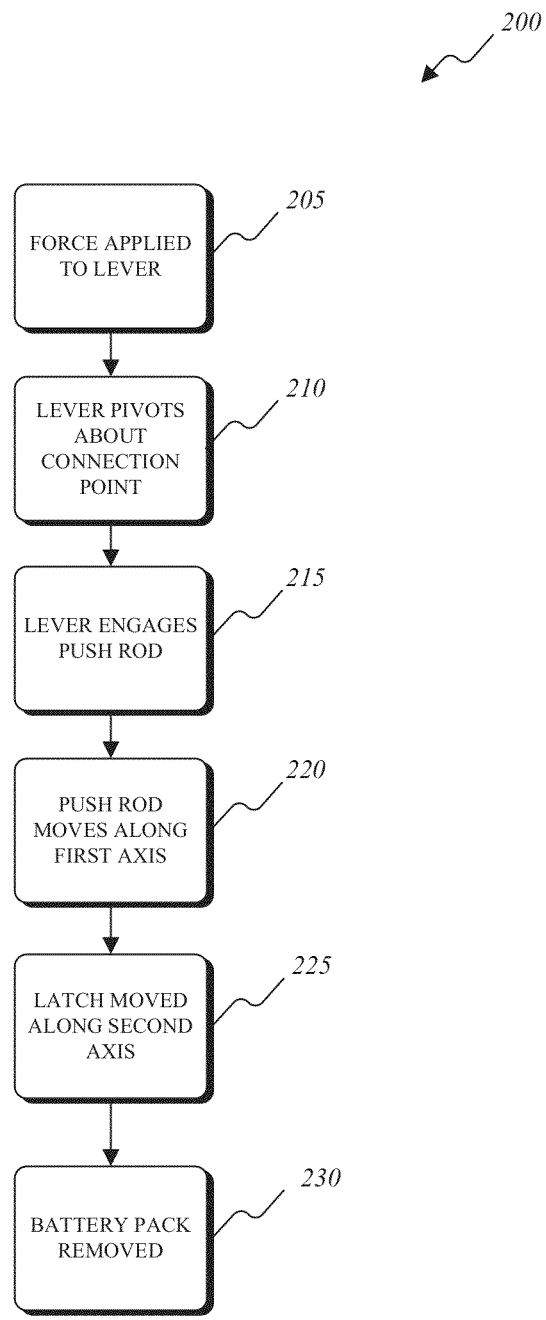
FIG. 11 shows a process for removing the battery pack of FIG. 2 from a device according to an embodiment of the invention.

A process 200 for removing the battery pack 50 from a device is illustrated in FIG. 11. The process 200 includes applying a force to the first end 80 of the lever 75 (step 205). The force applied to the lever 75 causes the lever 75 to pivot about a connection point 100 (step 210) and the second end 105 to engage the push rod 90 (step 215). The pivoting of the lever 75 is translated into a movement of the push rod 90 along the first axis 150 (step 220) following engagement with the second end 105 of the lever 75. The movement of the push rod 90 causes the latch 95 to move against the biasing force of the biasing element 165 and move from the latched position to the unlatched position along the second axis 155 (step 225). Once in the unlatched position, the latch 95 allows the battery pack 50 to be removed from the device (step 230).

Figure 13:
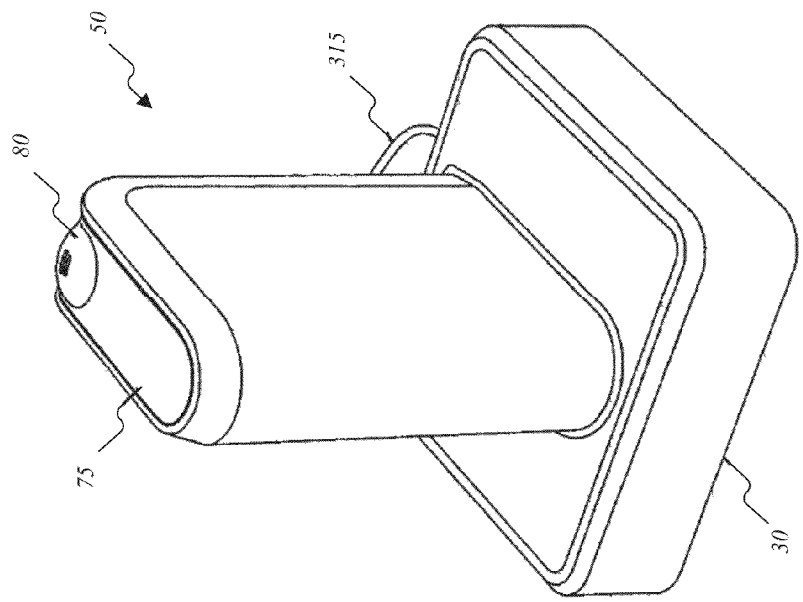
FIG. 13 is a perspective view of the battery pack of FIG. 2 inserted into the battery charger of FIG. 12.
Figure 12:
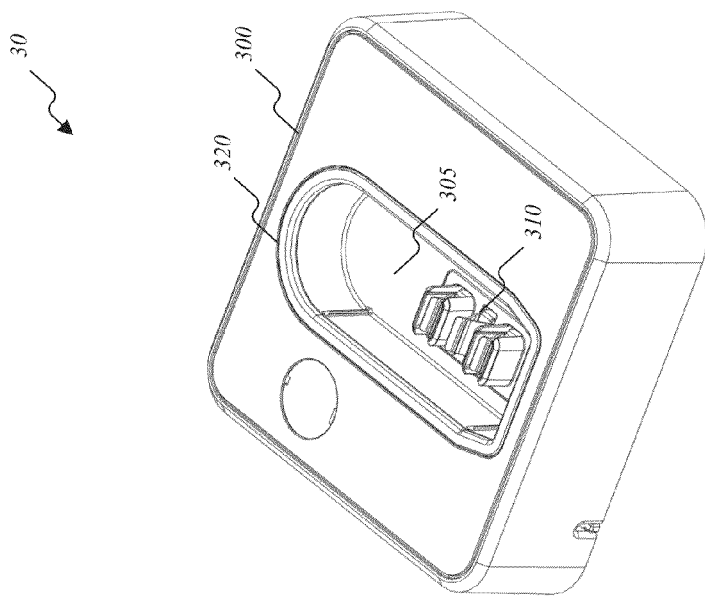
FIG. 12 is a perspective view of a battery charger according to an embodiment of the invention.

As previously described, the battery pack 50 is configured to be coupled to any of a plurality of devices, such as the devices illustrated in the cleaning system 10 of FIG. 1. The battery charger 30 is illustrated in FIG. 12 and includes a charging base 300 which receives the battery pack 50 in a recess 305. Electrical connectors 310 connect the battery charger 30 to the battery pack 50. FIG. 13 illustrates the battery pack 50 coupled to the battery charger 30. The battery charger 30 receives power from, for example, an AC or a DC voltage source via a power cord 315. The battery charger 30 converts the received power to a DC power level suitable for charging the battery pack 50. In some embodiments, the battery pack 50 has a run-time to charge-time ratio such that a device being powered by the battery pack 50 is able to operate for at least four minutes for every one hour of charging. In other embodiments, different run-time to charge-time ratios are provided.

The battery charger also includes an LED indicator 320. The LED indicator 320 provides information to a user related to the state of the battery charger 30 and the battery pack 50. For example, if the LED indicator 320 flashes twice followed by a one second off period, the battery pack 50 is either too hot or too cold. If the LED indicator 320 flashes continuously, the battery charger 30 has detected an error condition, or there is internal component damage to the battery pack 50 or battery charger 30. If the LED indicator 320 remains illuminated after a battery pack 50 is removed, the battery charger 30 either needs a reset, or there is internal component damage to the battery charger 30. When the LED indicator 320 is continuously lit, the battery pack 50 is charging, and if the LED indicator 320 pulses as it gradually dims and brightens, the battery pack 50 is fully charged.

Figure 14:
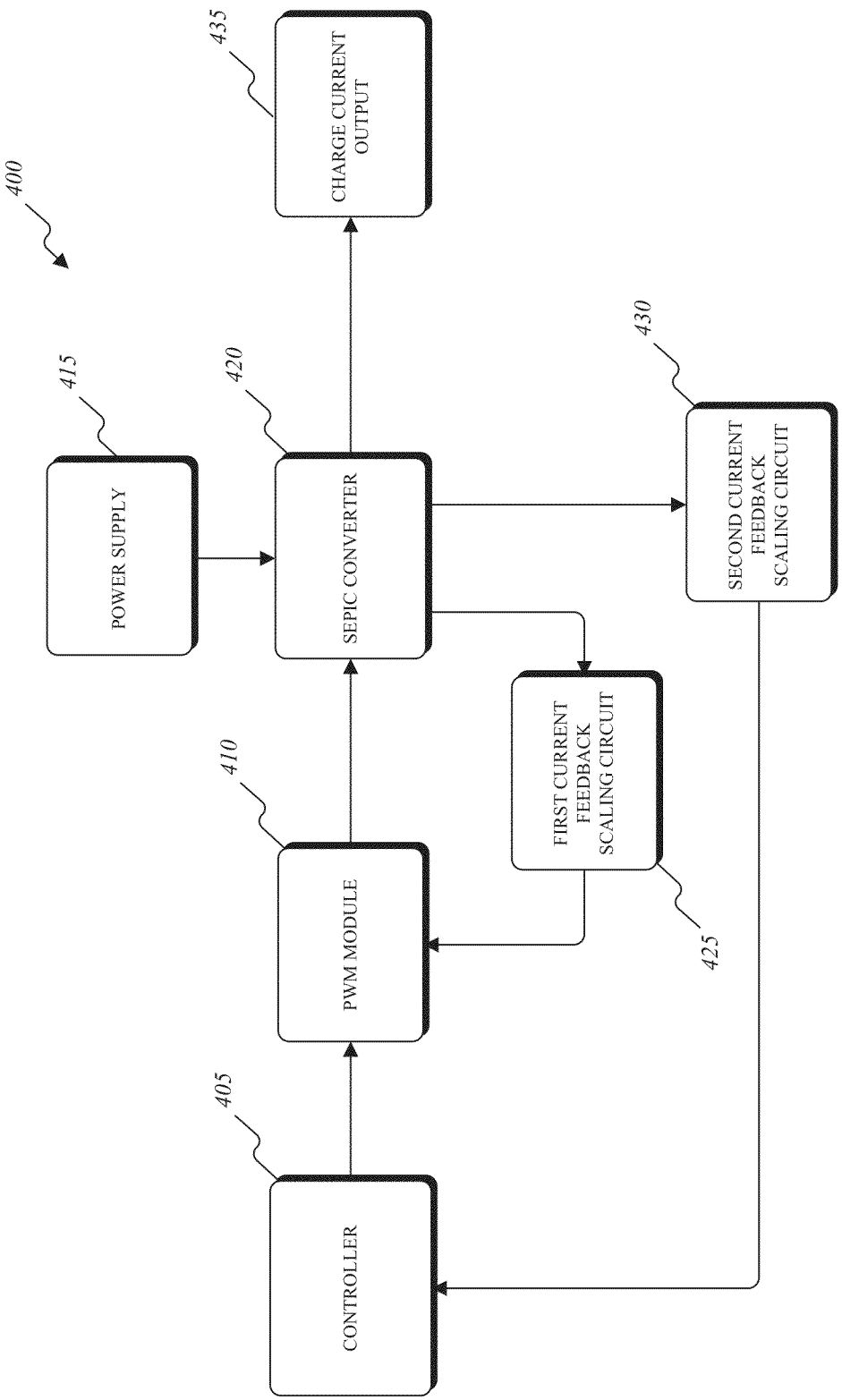
FIG. 14 illustrates a charging circuit for a battery charger according to an embodiment of the invention.

FIG. 14 illustrates a charging circuit 400 for the battery charger 30. The circuit 400 includes a device controller 405, a pulse-width-modulation ("PWM") module 410, a power supply module 415, a single ended primary inductor converter ("SEPIC") module 420, a first current feedback scaling module 425, a second current feedback scaling module 430, and a charge output module 435. The battery charger circuit also includes one or more LEDs for indicating the battery charger's status, as previously described. In other embodiments, other devices (e.g., vacuums) include features similar to those described below with respect to the battery charger.

The controller 405 includes, among other things, a processing unit (e.g., a microprocessor, etc.), memory, and a bus. The bus connects various controller components (such as the memory) to the processing unit. In one embodiment, the memory includes read-only memory ("ROM"), random access memory ("RAM"), electrically-erasable programmable read-only memory ("EEPROM"), or flash memory. The controller 405 also includes input/output interfaces and software that includes routines for transferring information between components within the controller 405. In other embodiments, the controller 405 includes additional, fewer, or different components. The controller 405 is also configured to communicate with other components or subsystems within the battery charger 30 using a bus or other communication interface. In some embodiments, a microcontroller that includes a memory and a bus is used in place of the controller 405.

The controller 405 is configured to generate a charge current demand signal. The controller 405 sends the charge current demand signal to the PWM module 410, and the PWM module 410 generates a PWM signal based on the charge current demand signal. The PWM signal is sent from the PWM module 410 to a current source such as the SEPIC converter module 420. The SEPIC converter module 420 is configured to provide a variable voltage and current source to charge the battery pack 50. The SEPIC converter module 420 includes, among other things, an oscillator, a power FET configured as a switching element, and additional support circuits. The current provided by the SEPIC converter module 420 is based on an analog voltage derived from the charge current demand signal and a low pass filter network (not shown). The SEPIC converter module 420 also includes two over-voltage shutdown inputs. A first over-voltage shutdown input is controlled by the controller 405, and a second over-voltage shutdown input is controlled by a comparator circuit that operates independently of the controller 405. The SEPIC converter module 420 provides first and second signals representative of the battery charging current to the first and the second current feedback scaling modules 425 and 430. Each of the first and second current feedback scaling modules 425 and 430 includes a single range of operation. No range selection signal is needed for the current feedback scaling modules 425 and 430 to properly provide feedback signals to the components of the battery charger 30.

The first current feedback scaling module 425 provides a first feedback signal to the PWM module 410. The PWM module 410 uses the first feedback signal to adjust the PWM signal to the SEPIC converter module 420 to provide a current that accurately corresponds to the charge current demand signal. The second current feedback scaling module 430 provides a second feedback signal to the controller 405. The controller 405 uses the second feedback signal to verify that the current flowing to the battery pack corresponds to the charge current demand signal. In some embodiments, the controller 405 adjusts the charge current demand signal in response to the second feedback signal.

The battery charger 30 is configured to monitor its output voltage and output current. If the output current exceeds a predetermined output current limit, the battery charger 30 turns off the SEPIC converter module 420 to interrupt the output current from the power terminals. If the voltage exceeds a predetermined output voltage limit, the battery charger 30 turns off the SEPIC converter module 420 to remove voltage from the power terminals.

The power supply module 415 supplies a nominal 18V DC voltage to the battery charger 30. The power supply module 415 is powered by mains power with nominal line voltages between, for example, 100V and 240V AC and frequencies of approximately 50-60 Hz. The power supply module 415 is also configured to supply lower voltages to operate circuits and components within the battery charger 30.

Figure 15:
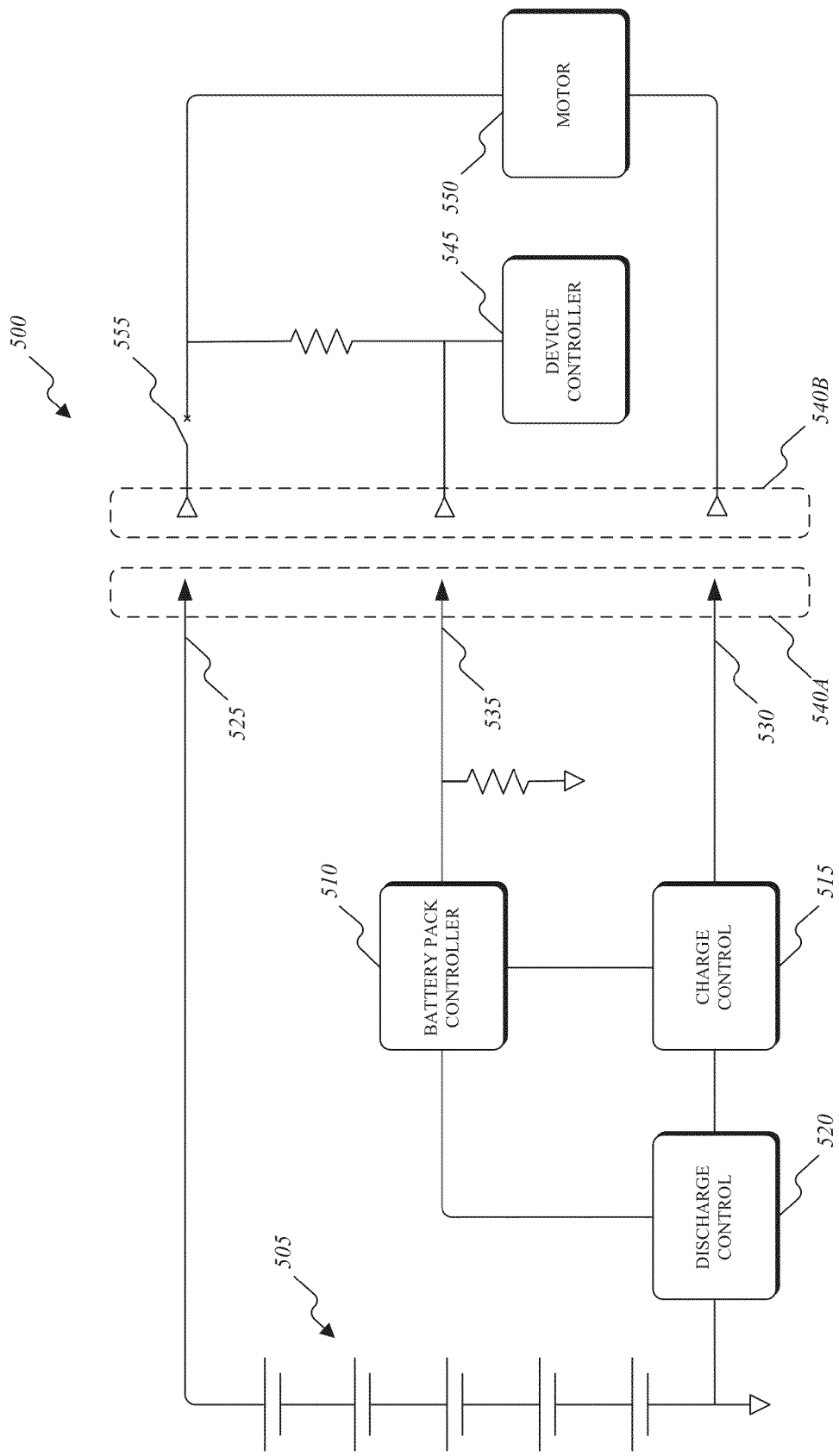
FIG. 15 illustrates a control circuit and an interface between a battery pack and a device according to an embodiment of the invention.

FIG. 15 illustrates a control circuit 500 for a battery pack, such as the battery pack 50. The control circuit 500 includes a cell assembly 505, a battery pack controller 510, a charge control module 515, and a discharge control module 520. The battery pack also includes a first power terminal 525, a second power terminal 530, a serial data line ("SDL") or communication terminal 535, and a product interface 540A. In other embodiments of the invention, the battery pack includes a plurality of additional power and/or communication terminals (e.g., multiple positive terminals). In some embodiments, the battery pack is configured to provide discharge currents between 7 and 11 Amps and can accommodate inrush currents of between 60 and 70 Amps. In other embodiments, the battery pack is configured to provide and accommodate different current ranges. The battery pack is configured to connect to a device that includes, for example, a battery pack interface 540B, a device controller 545, a motor 550, and a power switch 555.

Figure 16:
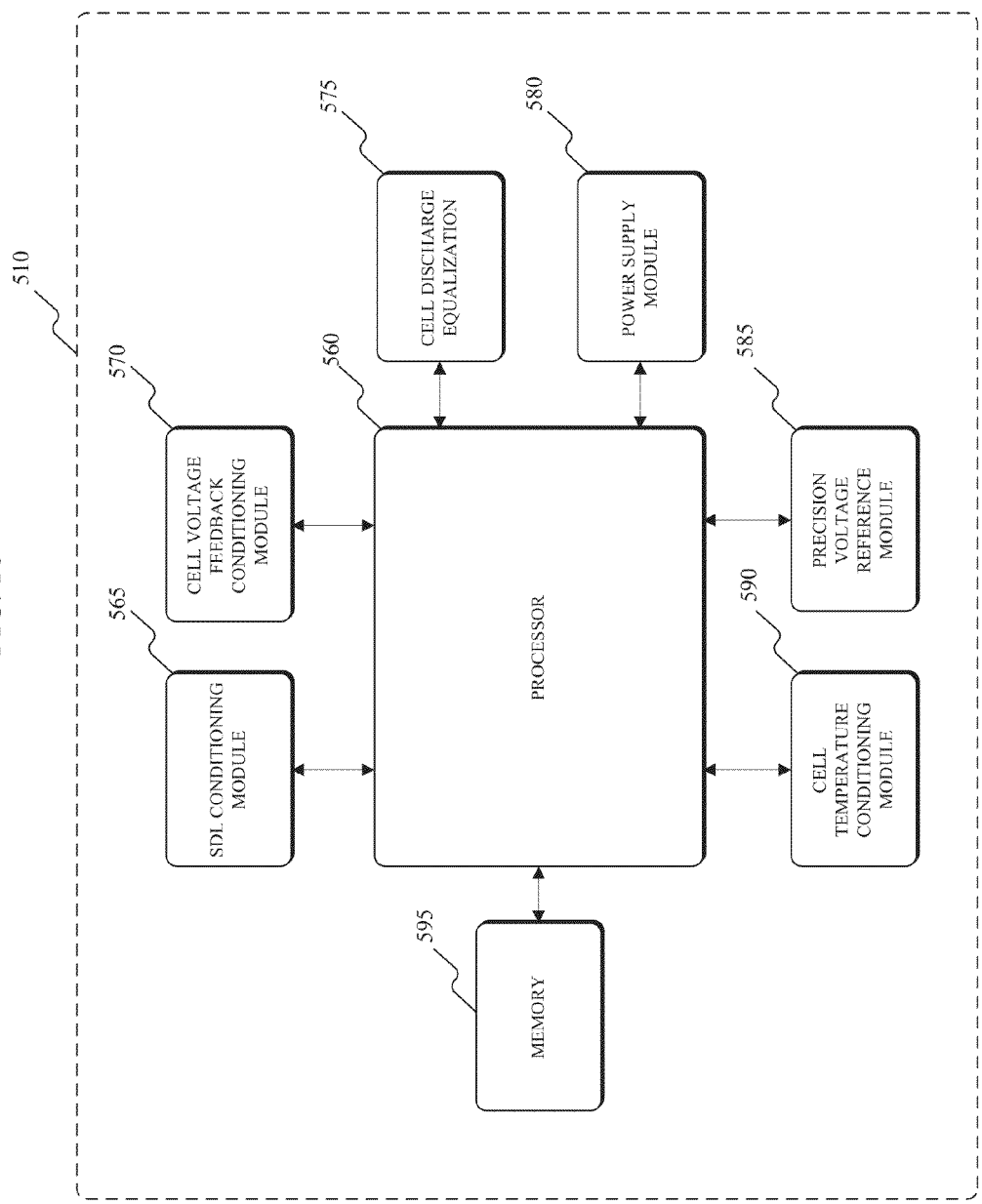
FIG. 16 illustrates a battery pack controller according to an embodiment of the invention.

As illustrated in FIG. 16, the battery pack controller 510 includes a processor or processing unit (e.g., a microprocessor, etc.) 560, a serial data line conditioning module 565, a cell voltage feedback conditioning module 570, a cell discharge equalization module 575, a power supply module 580, a precision voltage reference module 585, a cell temperature conditioning module 590, a memory 595, and one or more busses for interconnecting the components and modules within the controller 510. The busses connect the various modules and controller components to the processing unit 560. In one embodiment, the memory 595 includes read-only memory ("ROM"), random access memory ("RAM"), electrically-erasable programmable read-only memory ("EEPROM"), or flash memory. The controller 510 also includes input/output interfaces and software that includes routines for transferring information between components within the controller 510. In other embodiments, the controller 510 includes additional, fewer, or different components. The controller 510 is also configured to communicate with other components or subsystems within the battery pack using busses or another communication interface. Software included in the implementation of the battery pack is stored in the memory 595 of the controller 510. The software includes, for example, firmware, one or more applications, program data, and other program modules. In some embodiments, a microcontroller that includes a memory and a bus is used in place of the controller 510. Although the controller 510 is illustrated as including a plurality of additional modules, in other embodiments, one or more of the modules 565-595 are separate from and connected to the controller 510. The power supply module 580 is configured to provide a regulated DC voltage to the battery pack.

The battery pack controller 510 is configured to communicate with a device (e.g., a battery charger, a vacuum, etc.), measure the voltage of each cell in a cell assembly, measure the discharge current of the pack, control a plurality of field-effect-transistor ("FET") switches, measure the temperature of the cell assembly, and monitor the number of charge or discharge cycles. The battery pack communicates with the device via the SDL 535. The SDL is coupled to the serial data line conditioning module 565 to condition the data transmitted and received by the battery pack. Each device that is connectable to the battery pack is capable of interrupting the SDL connection to the battery pack to reduce leakage current experienced by the battery pack if the battery pack remains connected to the device for an extended period of time while in the sleep mode.

Executable instructions stored within the memory 595 of the controller 510 are configured to maintain a count (e.g., a 16-bit count) that represents the number of charge or discharge cycles experienced by the battery pack. Additionally or alternatively, the instructions are configured to maintain a first count and a second count (e.g., first and second 16-bit counts). A first count records charge cycles and the second count records discharge cycles. The charge/discharge counts are incremented each time the battery pack successfully enters a normal discharge or normal charge mode (described below). The counts are stored in the memory 595 of the battery pack controller 510.

The battery pack controller 510 is also configured to store charge and/or discharge operating parameters, cell identification information, and current charge capacity information in the memory 595. The battery pack provides the charge and/or discharge operating parameters to a battery charger, a configuration device, or a cleaning device. The operating parameters include, for example, a voltage rating of the battery pack, a manufacturer of the battery pack, a model number for each of the cells in the battery pack cell assembly, a voltage rating or measurement for each cell in the cell assembly, a cell temperature rating or measurement for each cell in the cell assembly, a data table for correlating cell voltage values with discharge current values, and the like. In other embodiments, more or different parameters are provided to the battery charger, configuration device, or cleaning device.

The battery pack uses the charge and/or discharge operating parameters to, among other things, provide a device fuel gauge with an accurate charge capacity estimation. The fuel gauge is universal in that it does not have to be modified or calibrated for a device's expected discharge current. As such, a fuel gauge within a device that requires 15 A of discharge current can also accurately display the charge capacity of a battery pack in a device that requires 5 A of discharge current. For example, when the battery pack is inserted into a device, the battery pack controller 510 is configured to communicate with the fuel gauge within the device via the SDL. The battery pack controller 510 includes a table that is used to correlate a cell voltage at a particular discharge current to a remaining charge capacity of the battery pack.

The battery pack continuously monitors and measures its discharge current to identify a portion of the table to use to determine the remaining charge capacity of the battery pack. The voltage of each cell within the battery pack is then measured. The lowest measured cell voltage is used as a pointer in the table. The battery pack uses the lowest battery cell voltage measurement and a discharge current measurement to determine an estimated battery capacity for the battery pack based on the identification and operating parameter information stored in memory. The battery pack controller 510 transfers the charge capacity information to the fuel gauge (e.g., to a fuel gauge controller or display device). For example, the estimated battery capacity is transmitted as a 2-bit code that has four possible capacity levels. In other embodiments of the invention, more bits can be used to increase the accuracy of the battery capacity estimation displayed on the fuel gauge.

The fuel gauge displays the charge capacity of the battery pack without having to perform calculations or measure voltages. In some embodiments, the fuel gauge includes three LEDs. When all three LEDs are in an illuminated state, the battery capacity is greater than or equal to 75%. When two LEDs are in an illuminated state, the battery capacity is greater than or equal to 50%. When one LED is in an illuminated state, the battery capacity is greater than or equal to 25%. If a single LED is blinking, the battery capacity is less than 25%. In other embodiments, more or fewer LEDs are used, and the LEDs display different battery capacity ranges. Devices that include a fuel gauge are also able to use the characteristics of the cells in the cell assembly to adjust the operation of the fuel gauge, such that the fuel gauge more accurately represents the charge capacity of the battery pack.

Additionally or alternatively, the devices are configured to communicate with the battery pack to adjust other operations based on the operating parameters of the battery pack and cells. For example, if the voltage of one of the battery cells falls below a predetermined low voltage limit, the battery pack turns off the charge control module 515 and the discharge control module 520 to terminate the discharge current regardless of the logic level of the SDL or the presence of valid communication with the device controller 545. In some embodiments, the device terminates operation, prohibits features, or reconfigures itself to operate at a different voltage based on the information from the battery pack.

Because the battery pack provides information to the device to which it is connected, the battery charger 30 can be used to charge a variety of different battery packs without requiring a user to specify the battery pack voltage. The battery charger 30 adjusts, for example, charging currents, charging voltages, and cut-off thresholds to accommodate manufacturer's specifications for each cell in the cell assembly. By adjusting charge and discharge parameters for each cell in the cell assembly, the life and performance of the battery pack can be improved and errors relating to incorrect charging and/or discharging parameters can be reduced or eliminated.

The cell voltage feedback conditioning module 570 is configured to attenuate and condition the voltages from each cell in the cell assembly 505 to a level that is within the measurement range of the battery pack controller 510's analog-to-digital converter ("ADC"). The cell voltage feedback conditioning module 570 is activated by the battery pack controller 510 when the voltage of a cell is being measured, and is turned off by the battery pack controller 510 when cell voltages are not being measured to prevent unnecessary cell discharge. The cell discharge equalization module 575 is configured to apply a nominally equal load to each cell in the cell assembly 505 to prevent an imbalance in battery cell discharge. The cell discharge equalization module 575 is turned on and off at the same time as the cell voltage feedback conditioning module 570.

The precision voltage reference module 585 is configured to provide a precise reference voltage to the controller 510's ADC. The voltage reference is used by the ADC to measure signals within the battery pack. The precision voltage reference module 585 is activated by the battery pack controller 510 when the ADC is taking a measurement. The cell temperature conditioning module 590 is configured to measure the temperature of the cells in the cell assembly using, for example, a thermistor. In some embodiments, the thermistor is thermally coupled to the cells using a thermally conductive gel.

The charge control module 515 is configured to control when the cell assembly 505 is charged. The charge control module 515 includes at least one FET which is configured as a switch and is controlled by the battery pack controller 510. If the FET is "on," the cell assembly 505 can be charged. If the FET is "off," the cell assembly 505 cannot be charged. The discharge control module 520 includes at least one FET configured as a switch to control current discharge from the cell assembly 505. If the FET is "on," the cell assembly 505 can be discharged. If the FET is "off," the cell assembly 505 cannot be discharged. The discharge control module 520 is controlled by the battery pack controller 510.

Figure 17:
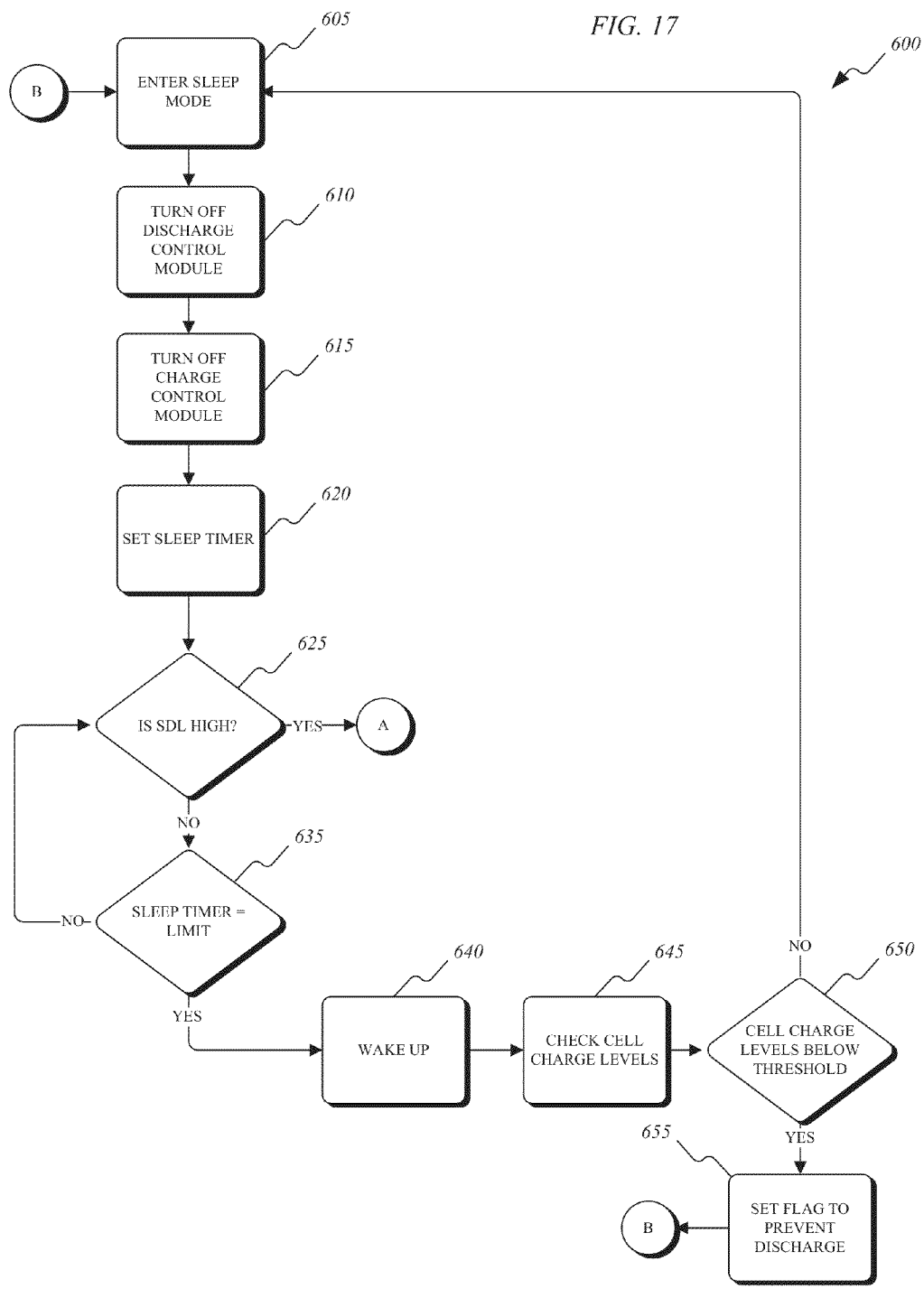
FIGS. 17 and 18 show a process for switching a battery pack between a "sleep" mode and a "wake" mode.
Figure 18:
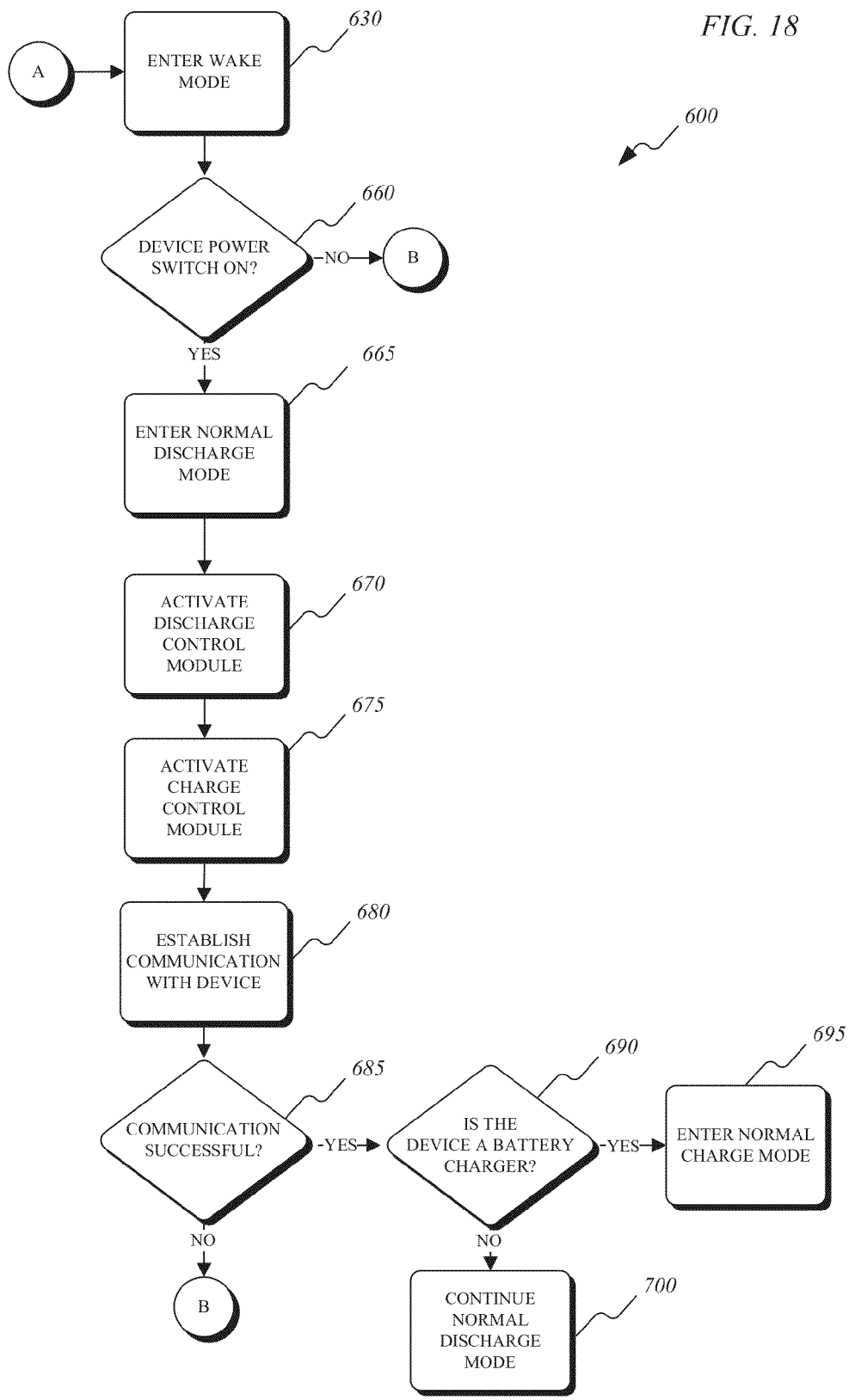

A process 600 for switching the battery pack between a "sleep" mode and a "wake" mode is illustrated in FIGS. 17 and 18. In addition to being a low-power mode for the battery pack, the sleep mode also provides safety benefits to the battery pack and its users. For example, while in the sleep mode, the battery pack is unable to supply any significant amount of power to an external device or its power terminals (e.g., currents in the micro-ampere range). As such, the risk of, for example, short-circuited power terminals causing a fire or similar safety concern is eliminated or significantly reduced. The battery pack enters the sleep mode (step 605) when it is not inserted in the battery charger or a cleaning device, as described below. During the sleep mode, the discharge control module 520 is turned off (step 610) and the charge control module 515 is turned off (step 615) to prevent the battery pack from sourcing any significant current between a positive terminal and a negative terminal of the battery pack. Turning off the charge control module 515 and the discharge control module 520 also removes the ground path for the battery cells contained within the battery pack and removes the voltage from the power terminals. Turning off the charge control module 515 and the discharge control module 520 also prevents the battery pack from supplying power to an external load, being charged by the battery charger 30, or being short-circuited. With the ground path removed, no devices are able to communicate with the battery pack controller 510 because there is no common ground reference. In some embodiments, a small signal-level current can flow between the positive terminal and the SDL when the battery pack is in the sleep mode. A sleep timer is then set (step 620). Hardware within the battery pack controller continuously monitors the SDL (step 625). If a high logic level (e.g., a high TTL level) is applied to the SDL, the hardware interrupts the battery pack controller 510, and the controller 510 enters the wake mode (step 630) (FIG. 18). Otherwise, the controller 510 remains in the sleep mode.

While in the sleep mode, the battery pack controller 510 is configured to compare the sleep timer to a limit (e.g., 60-120 minutes) (step 635). The battery pack wakes up (step 640) when the sleep timer is equal to the limit. The battery pack performs a cell voltage check (step 645) to determine (step 650) whether the battery pack's cell assembly charge level has fallen to a level or below a threshold that prohibits discharge. If the battery pack determines that one or more of its cells have fallen below the minimum allowable level, the battery pack sets a software flag to prevent discharge (step 655) and the battery pack re-enters the sleep mode (step 605). The battery pack removes the software flag after the battery pack has been connected to the battery charger 30. If the cells have not fallen below the minimum allowable level, the battery pack is configured to re-enter the sleep mode (step 605). In some embodiments, the battery pack is configured to disconnect a positive terminal of the cell assembly to remove voltage from the power terminals, and additional or different hardware is used to switch between the sleep and wake modes. In some embodiments, various steps described above are combined into a single step, or the steps are executed in a different order. For example, in one alternative embodiment, the sleep mode is entered when the sleep timer is set.

The wake mode and wake-up procedure described herein are interrupt-driven. As such, the battery pack enters the wake mode without having to wait for a predefined time period or for the battery pack controller 510 to poll the SDL. If the battery pack is connected to a device with its power switch turned on, the device connects the battery pack's SDL to the battery pack's positive power terminal via a resistor network, and the battery pack's SDL is pulled high (e.g., pulled to a logical high level). When the battery pack controller 510 determines that a high logic level is applied to the SDL, the battery pack enters the wake mode (step 630). The battery pack controller 510 then debounces the SDL and verifies whether the battery pack is connected to a device with its power switch turned on (step 660). The battery pack controller 510 debounces the SDL for a predetermined period of time (e.g., 60 ms) to ensure that the voltage at the SDL was not a result of a noise spike.

If the battery pack is not connected to a device or the device's power switch is not turned on, the battery pack re-enters the sleep mode (step 605). If the battery pack controller 510 determines that the logic level present at the SDL is the result of a connection between the battery pack and a device with its power switch turned on, the battery pack enters a normal discharge mode ("NDM") (step 665) and activates or turns on the discharge control module 520 (step 670) and the charge control module 515 (step 675). Activating the discharge control module 520 and the charge control module 515 provides a common ground reference between the battery pack and the device, and power to the positive and negative power terminals. Communication between the battery pack and the device is then able to begin. The battery pack is configured to establish communication (step 680) with the device controller 545 via the SDL. The battery pack then determines whether communication has been established (step 685). If communication is not established, the battery pack re-enters the sleep mode (step 605). If communication is established, the battery determines whether the device is a battery charger (step 690). If the device is a battery charger, the battery pack enters a normal charge mode ("NCM") (step 695). If the device is not a battery charger, the battery pack continues to operate in the normal discharge mode (step 700).

In other embodiments of the invention, the battery pack is configured to disconnect a positive terminal of the cell assembly 505 (e.g., turn off at least one FET) when the battery pack is in the sleep mode. When the battery pack is inserted into a device, the device connects the SDL to the battery pack's negative terminal to provide a logical low level to the SDL when the device power switch 555 is turned on. The SDL is connected to the negative terminal using a resistor network within the device. The battery pack is configured to communicate with the device and debounce the SDL as described above. If, after debouncing, the logic level of the SDL meets predetermined conditions for a low logic level, the battery pack controller 510 turns on the charge and discharge control modules to supply current to or receive current from the device.

The battery pack is also configured to transmit multi-byte messages to the device on the SDL. The device is configured to receive the messages on the SDL and respond with a message to the battery pack controller 510 related to, for example, the condition of the battery pack (e.g., charging mode, discharging mode, etc.). The battery pack controller 510 periodically polls the device controller 545 to verify presence and proper function. For example, the battery pack controller 510 sends five messages over the SDL during a period of one second to initiate communication with the device. If the battery pack controller 510 does not receive an expected response or a valid message from the device controller 545 during this time period, the battery pack controller 510 turns off the charge and discharge control modules 515 and 520, and enters the sleep mode regardless of the logic level of the SDL. Turning off the charge and discharge control modules 515 and 520 removes the ground path for the cell assembly 505 to stop the supply of power to the device.

Additionally or alternatively, if the battery pack and the device fail to successfully maintain communication, the battery pack controller 510 turns off the charge and discharge control modules 515 and 520 and enters the sleep mode. For example, the battery pack controller sends a message to the device controller approximately once per second. If the battery pack controller does not receive a valid response to this message within a certain number of communication cycles (e.g., three communication cycles), the battery pack controller 510 turns off the charge and discharge control modules 515 and 520 and enters the sleep mode. In other embodiments, the battery pack is configured to disconnect the positive terminal of the cell assembly to stop the supply of power to the device, and the battery pack enters the sleep mode. If the battery pack receives a valid response from the device, the battery pack remains in the wake mode. While in the wake mode, the charge and discharge control modules 515 and 520 remain on, the battery pack provides a connection to the positive terminal of the cell assembly to provide power to the battery pack's power terminals, and the battery pack is able to power a device or be charged by the battery charger 30.

The wake mode includes the NDM and the NCM. If the battery pack is connected to a device, is in communication with the device via the SDL, and has determined that the device is not a battery charger, the battery pack is configured to operate in the NDM. When in the NDM, the battery pack verifies that the voltages and temperatures of its cells are within predetermined operational limits. If the battery pack sends a message to the device and receives a valid response on the SDL, the battery pack continues to supply power through the power terminals. If the battery pack does not receive a valid response through the SDL for a predetermined number of communication cycles, the battery pack turns off the charge control module 515 and discharge control module 520 and enters the sleep mode.

When operating in the NDM, the battery pack also continuously monitors a discharge current from its power terminals. If the discharge current is not within predetermined operational limits for current discharge versus time, the battery pack turns off the charge control module 515 and the discharge control module 520 to terminate the discharge current and enters the sleep mode regardless of the logic level of the SDL or the presence of valid communication with the device controller 545.

The battery pack also monitors the temperature of the battery cells in the cell assembly 505. In order to compensate for thermal lag in the battery pack's temperature measurement system, the battery pack applies a temperature correction factor using an index value based on the discharge current. The correction factor is only used if the measured cell temperature is above 25° C. If the corrected temperature measurement is not within predetermined operational temperature limits, the battery pack turns off the charge control module 515 and the discharge control module 520 to terminate the discharge current and enters the sleep mode regardless of the logic level of the SDL or the presence of valid communication with the device controller 545.

When the battery pack is discharging current, the battery pack continuously communicates with the device. For example, the battery pack controller 510 initiates and controls communication with the device. In other embodiments, the device controls communication with the battery pack (e.g., the device functions as a master device and the battery pack functions as a slave device). If the device fails to respond to the battery pack for the predetermined number of consecutive communication cycles (e.g., three cycles), the battery pack turns off the charge control module 515 and the discharge control module 520 to terminate the discharge current and then returns to the sleep mode.

Additionally, when the battery pack is discharging current, the battery pack also continuously monitors the voltage of each of the battery cells. If the voltage of one of the battery cells falls below a predetermined low voltage limit, the battery pack turns off the charge control module 515 and the discharge control module 520 to terminate the discharge current and then enters the sleep mode regardless of the logic level of the SDL or the presence of valid communication with the device controller 545.

When the battery pack terminates a current discharge process, the battery pack transmits a termination message to the device on the SDL that indicates why the current discharge process is being terminated. The battery pack transmits the termination message unless, for example, an over-current condition occurs during discharge which requires discharge current to be terminated in a period of time that precludes the battery pack from transmitting the termination message.

Additionally, if the battery pack enters the NDM as a result of being coupled to a configuration device, a special set of operating parameters are enabled. Configuration devices have the ability to request that the battery pack read and/or write values from individual memory locations (e.g., non-volatile memory locations) within the battery pack's memory 595. Such an ability is particularly beneficial for devices which are assembled at multiple locations, or devices which have components that are manufactured at one or more locations but are assembled at another location. The ability to adjust operating parameters enables uniform operation of each of the devices, allows for the access of charge/discharge information stored within the memory, and allows for the modification of, for example, cell-specific charging parameters. The configuration device is a dedicated device or is incorporated into a device such as the battery charger 30 or a cleaning device. The configuration device includes a user interface that is configured to display operating parameters of the battery pack and allow a user to adjust the operating parameters of the battery pack. The configuration device is configured to request that the battery pack provide specific operating parameters or the contents of a specific memory location. The configuration device is also configured to request that the battery pack adjust a specific operating parameter or the value of a specific memory location to a value provided by the configuration device. For example, calibration data stored within the battery pack's memory can be read or modified, or the charge/discharge cycle count data can be retrieved. In other embodiments, the configuration device is configured to verify that the value of a memory location has been adjusted by requesting that the battery pack provide the adjusted memory value to the configuration device.

If the configuration device requests information from the battery pack, the battery pack remains as the master device during communications. The battery pack initiates communications with the configuration device, and the configuration device responds to the communications from the battery pack. If the configuration device requests that the battery pack provide the value of a particular memory location, the battery pack complies but responds to the request on the next communication cycle. In some embodiments, the configuration device initiates communication with the battery pack.

When the battery pack is operating in the NCM, the battery pack controls the charging operations. However, the battery charger 30 does not completely relinquish charging control to the battery pack. For example, the battery charger determines whether to terminate a constant-voltage charge during a charging process. The battery pack stores cell-specific charge parameters in its non-volatile memory and provides charging process information to the battery charger 30 for use during the charging process. When the battery pack is receiving a charging current, the battery pack continuously communicates with the battery charger 30. If the battery charger 30 fails to receive messages from the battery pack for the predetermined number of communication cycles, the battery charger 30 turns off the SEPIC converter module 420 and removes voltage from the charging terminals.

The battery pack measures the voltage of each of the cells in the cell assembly 505 during the NCM. When one of the cells within the cell assembly 505 reaches a specified cut-off voltage, the battery pack requests that the battery charger 30 enter a constant-voltage charge mode. After the battery charger receives the request to enter the constant-voltage charge mode, the charging process is controlled by the battery charger 30.

While in the constant-voltage charge mode, the battery charger 30 provides a constant voltage to the terminals of the battery pack and monitors the charge current. If the charge current falls to a predetermined limit, the battery charger 30 terminates the charging process, and the battery pack turns off the charge control module 515 and the discharge control module 520 to terminate the charging current and enters the sleep mode.

While in either the constant-voltage charge mode or the constant-current charge mode, the battery pack also measures the temperatures of the cells within the cell assembly. Based on the battery cell temperatures, the battery pack requests normal charge parameters (i.e., NCM parameters), or reduced current charge parameters, or turns off the charge and discharge control modules 515 and 520 to terminate the charging current temporarily until temperatures of the battery cells return to predetermined operational limits. If the battery pack indicates to the battery charger 30 (e.g., via the SDL) that a cell temperature within the battery pack cell assembly is outside of a predetermined temperature range, the battery charger 30 turns on the LED indicator as previously described and waits for the cell temperatures to normalize and the battery pack to again request the charging current.

Depending on the charging mode (e.g., constant-current or constant-voltage charging mode), a plurality of redundant checks are performed by either the battery pack or the battery charger 30 while the other is controlling the charging process. During the NCM, the battery charger 30 monitors the overall pack voltage and controls switching from the constant-current charging mode to the constant-voltage charging mode if the battery pack does not request a change in charging modes, and the battery pack voltage is within the predetermined voltage limits for the constant-voltage charging mode. Similarly, during constant-voltage charging mode, the battery pack monitors battery cell voltages and the overall pack voltage. If either the cell voltages or overall pack voltage satisfies predetermined limits for the battery pack being fully charged, the battery pack turns off the charge and discharge control modules 515 and 520 to terminate the charging current and enters the sleep mode.

The battery pack and battery charger 30 also include charge timers. Both of the charge timers are operational any time that a battery pack is being charged, including idle periods when battery cell temperatures temporarily prohibit further charging. If the battery pack charge timer exceeds a predetermined time limit, the battery pack turns off the charge and discharge control modules 515 and 520 to terminate the charging current and enters the sleep mode. Additionally or alternatively, if the battery charger charge timer exceeds a predetermined time limit, the battery charger 30 transmits a message to the battery pack and turns off the SEPIC converter module 420 to remove voltage. The battery charger 30 is also configured to turn the LED indicator 320 on and off to indicate the time-out condition. When the battery pack terminates a charging process, the battery pack transmits a termination message to the battery charger 30 on the SDL that indicates why the charging process is being terminated.

As previously described, the battery pack 50 is configured to be coupled to any of a plurality of devices. FIGS. 19-23 illustrate an electrically powered cleaning device, such as a stick-type vacuum 20 which receives power from the battery pack 50. In some embodiments, the vacuum cleaner 20 and the battery pack 50 have a combined weight of less than approximately 7.5 pounds. The vacuum cleaner 20 includes a handle portion 805, a body portion 810, and a base or nozzle base portion 815. In some embodiments, the vacuum cleaner 20 includes a hose or other attachments.

The handle portion 805 includes a first section 820 and a second section 825. The first section 820 is oblique with respect to the second section 825 and includes a grip portion 830 (FIG. 21). The grip portion 830 is on an opposite side of the first section 820 as a power switch or selection device 835. In some embodiments, the grip portion 830 extends completely or almost completely around the first section 820. The first section 820 of the handle portion 805 also includes a capacitive touch sensor for determining whether a user is touching the handle portion 805. If the user is touching the handle portion 805, the vacuum cleaner 20 operates as selected using the power switch 835. If the user is not touching the handle portion 805, the vacuum cleaner 20 reduces the speed of a motor/fan assembly 840. By reducing the speed of the motor/fan assembly 840 (e.g., by reducing the current provided to the motor/fan assembly 840), the vacuum cleaner 20 is able to conserve power when the user is away from the vacuum cleaner 20.

The second section 825 of the handle portion 805 includes, among other things, a plurality of indicators 845 for providing indications to a user related to the operational mode of the vacuum cleaner 20. In some embodiments, the handle portion 805 includes a first LED indicator and a second LED indicator. The first LED indicator provides an indication to a user related to whether suction is active for the vacuum cleaner 20. The second LED indicator provides an indication to the user related to whether suction and a brush roll are active for the vacuum cleaner 20. When the vacuum cleaner 20 is off or in an inactive state, neither the first nor the second LED indicators is in an illuminated state. When the vacuum cleaner 20 is in a suction only operational mode, the first LED indicator is in an illuminated state. When the vacuum cleaner 20 is in a suction and brush roll operational mode, the second LED indicator is in an illuminated state. The operational mode of the vacuum cleaner 20 is set by the power switch 835, which is manipulable by a finger of a user while grasping the first section 820 of the handle portion 805. In some embodiments, the switch 835 is rolled by a user into a plurality of positions corresponding to operational modes of the vacuum cleaner 20.

Figure 24:
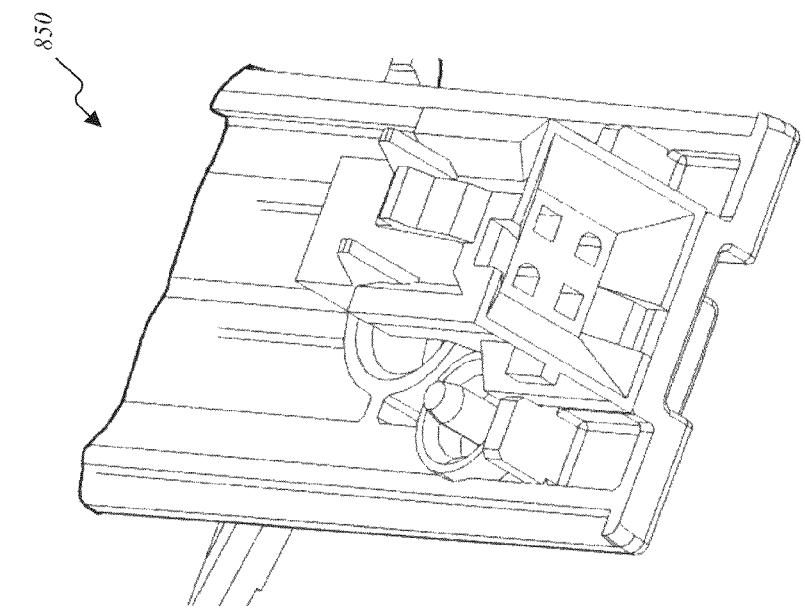
FIG. 24 is a perspective view of an interface between a handle portion and a body portion of the cleaning device of FIG. 19 according to an embodiment of the invention.

In some embodiments, the handle portion 805 is removably coupled to the body portion 810. For example, for storage or transport purposes, the handle portion 805 is detachable from the body portion 810. In such embodiments, the handle portion 805 is coupled and secured to the body portion 810 via friction only. In other embodiments, a screw or other suitable fastening device is used to secure the handle portion 805 to the body portion 810. As shown in FIG. 24, the handle portion 805 also includes a plurality of electrical connectors 850 located at an interface 855 between the handle portion 805 and the body portion 810. The electrical connectors 850 connect the handle portion 805 to the body portion 810 such that electrical signals related to the operation of the vacuum cleaner 20 are provided to the body portion 810 to control, for example, the motor/fan assembly 840.

The body portion 810 includes a recess 860, a fuel gauge 865, the motor/fan assembly 840, and a refuse chamber 870. In some embodiments, the body portion 810 also includes a cyclonic separator. The recess 860 is shaped and configured to receive the battery pack 50, and is positioned along a centerline or axis (e.g., a first axis as described below) of the body portion 810. Such a positioning of the recess improves the balance, steering, and compactness of the vacuum cleaner 20. The recess 860 includes a plurality of electrical connectors similar to the electrical connectors 310 shown in FIG. 12 with respect to the battery charger 30 for electrically connecting the battery pack 50 to the vacuum cleaner 20. As described above, the fuel gauge 865 is configured to provide an indication to the user of the charge level of the battery pack 50 inserted into the vacuum cleaner 20. In the illustrated embodiment, the fuel gauge 865 is positioned above the recess 860. The fuel gauge 865 is oblique with respect to the second section 825 of the handle portion 805 such that a user is able to read the fuel gauge 865 during normal operation of the vacuum cleaner 20 without having to divert his or her attention from operating the vacuum cleaner 20. In some embodiments, the fuel gauge 865 is located in the base portion 815 of the vacuum cleaner 20.

The motor/fan assembly 840 is positioned below the battery pack 50 and the fuel gauge 865. Such an arrangement between the battery pack 50 and the motor/fan assembly 840 is advantageous because airflow from the motor/fan assembly 840 provides cooling to the battery pack 50 and associated electronics. In some embodiments, the motor is a vertical brushless DC motor ("BLDC"). In other embodiments, different types of AC or DC motors are used, such as a brushed DC motor, a stepper motor, a synchronous motor, or other motors which use permanent magnets. In some embodiments, the body portion 810 also includes a diffuser, such as the diffuser disclosed in U.S. Pat. No. 7,163,372, entitled "DIFFUSER FOR A MOTOR FAN ASSEMBLY," the entire contents of which are hereby incorporated by reference.

Figure 25:
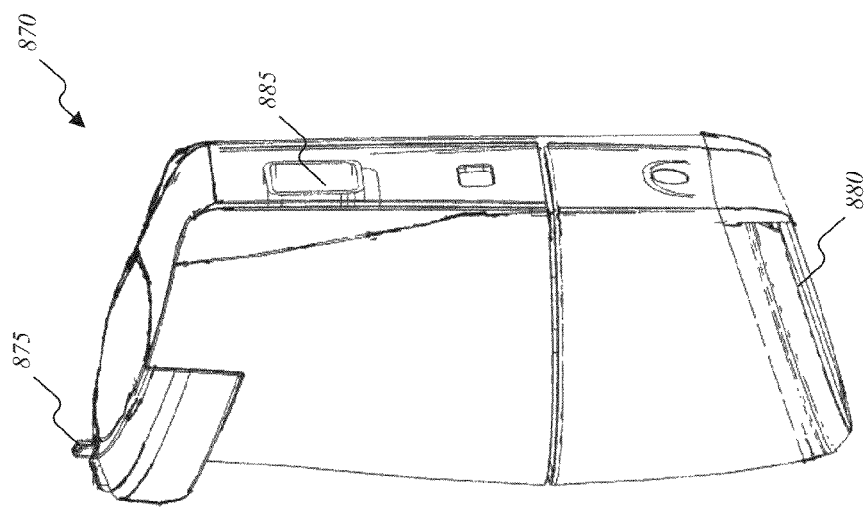
FIG. 25 is a perspective view of a refuse chamber for the cleaning device of FIG. 19 according to an embodiment of the invention.

The refuse chamber 870 is positioned below the motor/fan assembly 840, and is removably coupled to the body portion 810. In the illustrated embodiment, the refuse chamber 870 is bagless and includes a latching mechanism 875 (FIG. 25), which secures the refuse chamber 870 to the vacuum cleaner 20. The refuse chamber 870 also includes a lower portion having a latch 880 for emptying the contents of the refuse chamber 870 and an inlet 885 for receiving refuse.

Figure 26:
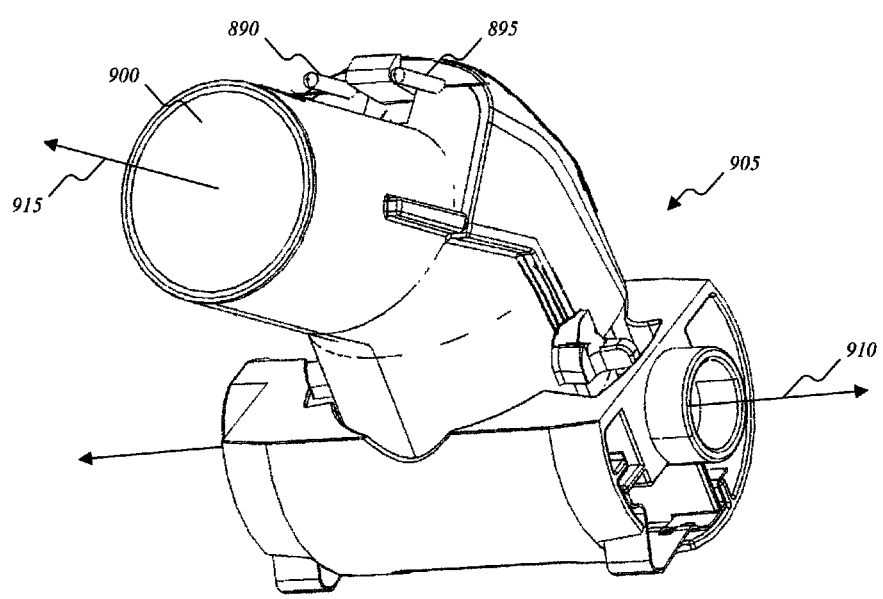
FIG. 26 is a perspective view of an interface between a base portion and a body portion of the cleaning device of FIG. 19 according to an embodiment of the invention.
Figure 27:
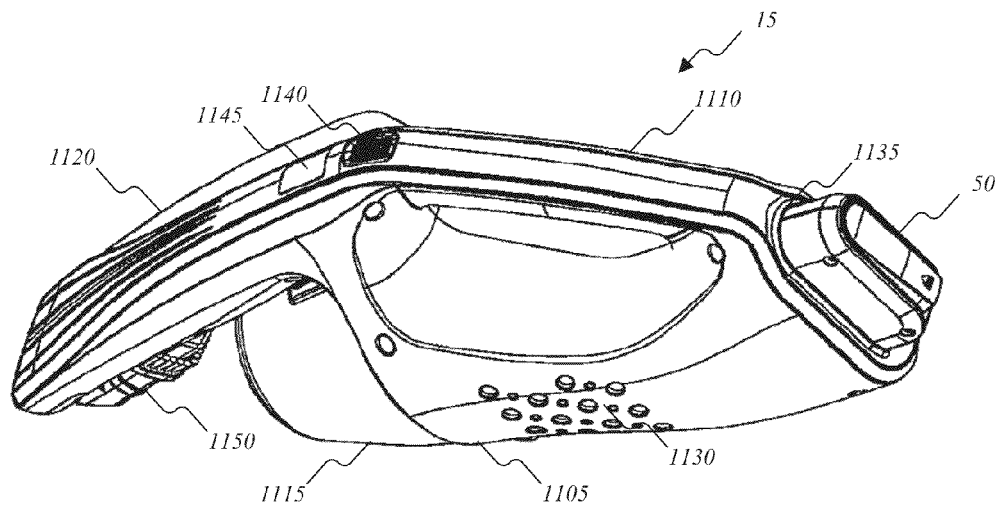
FIG. 27 is a perspective view of a cleaning device according to another embodiment of the invention.
Figure 28:
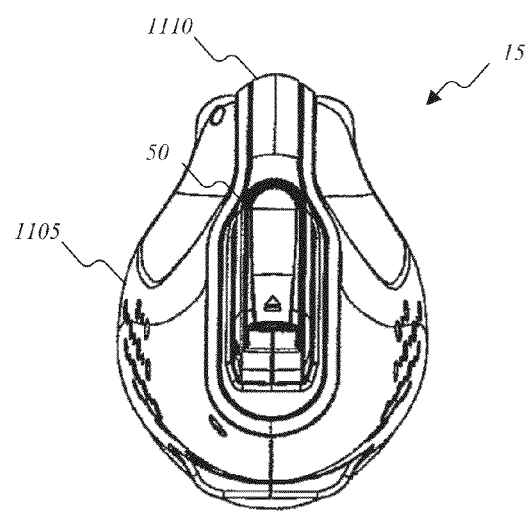
FIG. 28 is a rear view of the cleaning device of FIG. 27.
Figure 29:
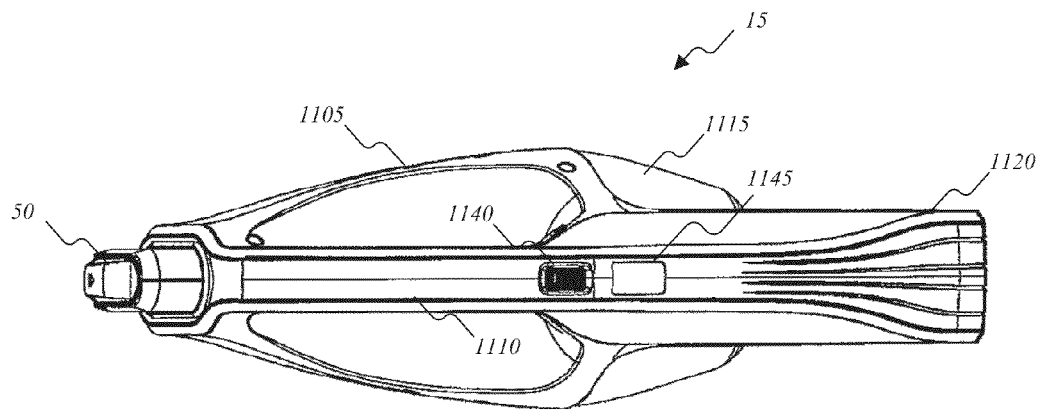
FIG. 29 is a top view of the cleaning device of FIG. 27.
Figure 30:
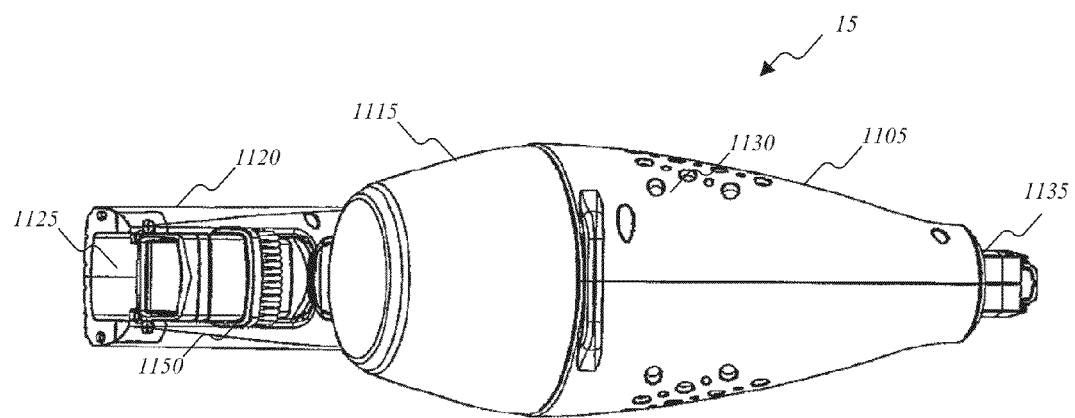
FIG. 30 is a bottom view of the cleaning device of FIG. 27.
Figure 31:
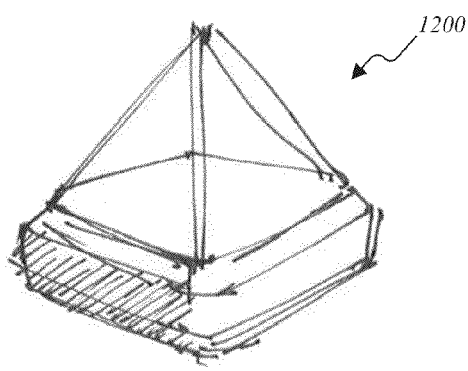
FIGS. 31-39 illustrate devices coupled to the battery charger of FIG. 12 according to embodiments of the invention.
Figure 32:
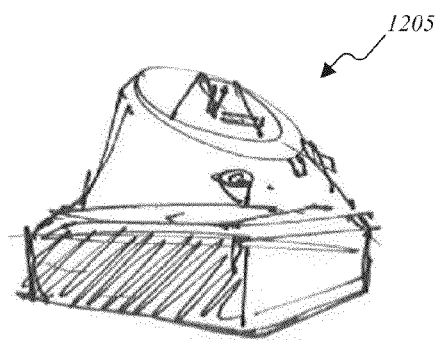
Figure 33:
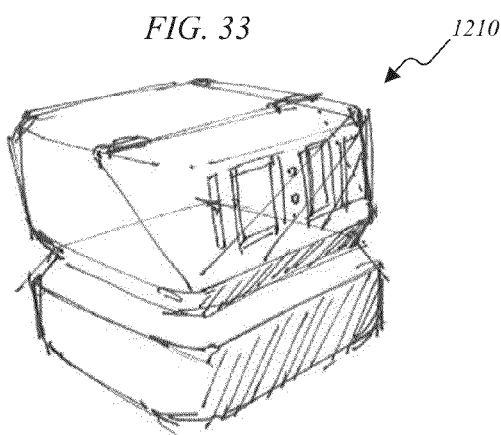
Figure 34:
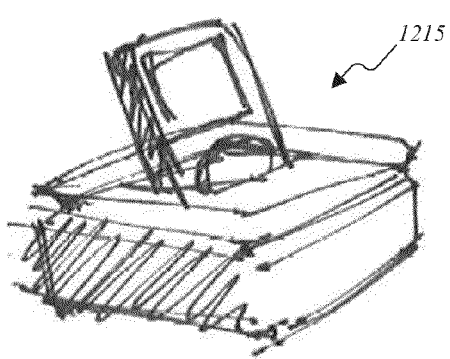
Figure 35:
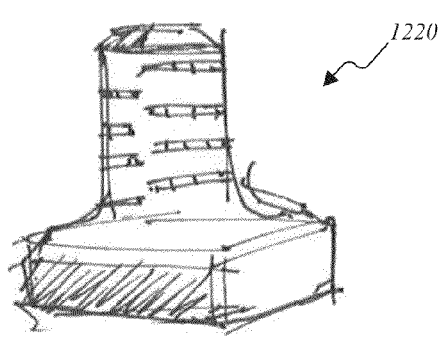
Figure 36:
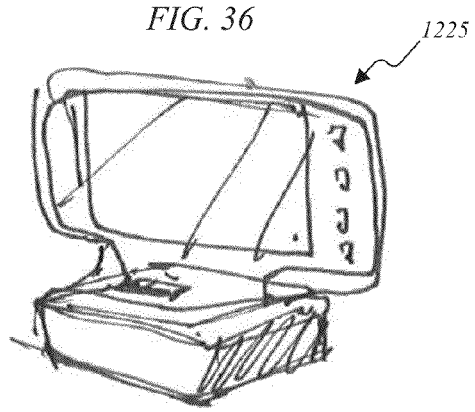
Figure 39:
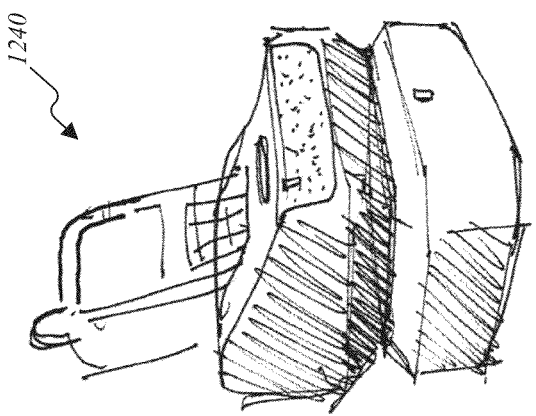
Figure 38:
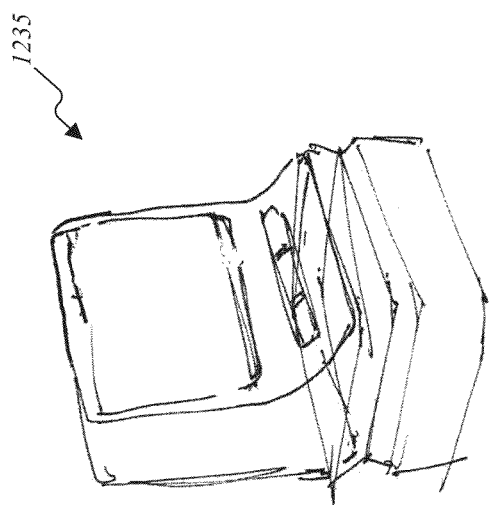
Figure 37:
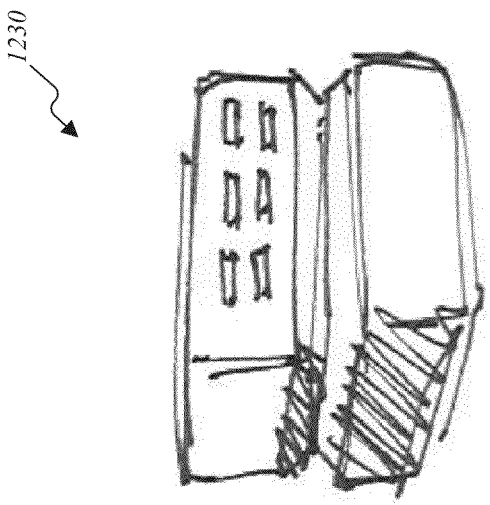

A lower end of the body portion 810 includes an interface for attaching the body portion 810 to the base portion 815. The base portion 815 includes a corresponding interface (FIG. 26) for attaching to the body portion 810. The interface includes, among other things, two terminals 890 and 895 for providing power to the base portion 815, and an outlet 900 for providing refuse to the body portion 810. The interface between the body portion 810 and the base portion 815 allows the vacuum cleaner 20 to stand upright without external support. For example, the vacuum cleaner 20 is operable in an upright working position in which the vacuum cleaner 20 can be operated without a user supporting the handle portion 805 or the body portion 810. The base portion 815 is capable of being detached from the body portion 810 without the use of a tool, such as a screwdriver.

The base portion 815 also includes a multi-axis pivot joint 905. In alternative embodiments, a ball joint is employed. The pivot joint 905 allows the handle and body portions 805 and 810 of the vacuum cleaner 20 to pivot with respect to the base portion 815. For example, the pivot joint 805 allows for pivotal movement of the handle and body portions 805 and 810 about a first axis 910 parallel to a cleaning surface. Pivotal movement about the first axis 910 allows the handle and body portions 805 and 810 to be moved from a position approximately perpendicular to the base portion 815 to a position approximately parallel to the ground. For example, the handle and body portions 805 and 810 of the vacuum cleaner 20 are able to be moved through an angle of between approximately 0.0° and approximately 90.0° with respect to the base. In other embodiments, the handle and body portions 805 and 810 are pivotable through larger angles.

The handle and body portions 805 and 810 are also pivotable along a second axis 915. The second axis 915 is approximately perpendicular to the first axis 910 and is approximately parallel to both the handle and body portions 805 and 810 of the vacuum cleaner 20. Pivotal movement about the second axis 915 provides additional control and maneuverability of the vacuum cleaner 20. The base portion 815 also includes a first wheel 920 and a second wheel 925 which provide rolling movement of the vacuum cleaner 20 along a cleaning surface following the application of an external force by a user. The first and second wheels 920 and 925 are coupled to the base portion 815 along the first axis 910. The base portion 815 includes a suction inlet 935 on an underside of the base portion 815. The suction inlet 935 includes an aperture or notch 940 which allows larger objects (e.g., cereal and similarly sized refuse) to enter the suction inlet 935 without requiring a user to lift the vacuum cleaner 20. In some embodiments, airflow through the base portion 815 is preconditioned.

The base portion 815 includes a brush roll motor (not shown) for rotating a brush roll 945. In one embodiment, the base portion 815 is implemented in a manner similar to that described in U.S. Pat. No. 5,513,418, entitled "SUCTION NOZZLE WITH DUCTING," the entire contents of which are hereby incorporated by reference. In other embodiments, the base portion is implemented in a manner similar to that described in U.S. Pat. No. 7,100,234, entitled "SUCTION NOZZLE ASSEMBLY," the entire contents of which are also hereby incorporated by reference. The brush roll motor is selectively activated by a user. For example, when the user selects the suction only operational mode for the vacuum cleaner 20, the brush roll motor is in an off state and the brush roll does not rotate. Such an operational mode is often used on cleaning surfaces such as, for example, hardwood floors. When the user selects the suction and brush roll mode, the brush roll motor is in an on state and the brush roll rotates. Such an operational mode is often used on carpeted surfaces. In some embodiments, the vacuum cleaner 20 is configured to provide at least approximately 6 air Watts of power at the suction inlet 935 of the base portion 815.

FIGS. 27-30 illustrate the battery pack 50 coupled to the hand-held vacuum 15. The hand-held vacuum 15 includes a body 1105, a handle 1110, and a refuse chamber 1115. The body 1105 includes a nozzle 1120, a suction inlet 1125 (FIG. 30), a suction motor/fan assembly 1130, and a recess 1135. The recess 1135 is sized and configured to receive the battery pack 50. The battery pack 50 couples to and electrically connects to the hand-held vacuum 15 in a manner similar to that described above with respect to the stick-type vacuum 20. The handle 1110 is integrated into the body 1105, and is positioned between the recess 1135 and the nozzle 1120. A junction of the handle 1110 and the nozzle 1120 includes a switch 1140 and a fuel gauge 1145. The switch 1140 includes, for example, a first position (e.g., an 'ON' position) and a second position (e.g., an 'OFF' position) for controlling the operation of the hand-held vacuum 15. In other embodiments, the switch 1140 includes additional positions corresponding to additional operational modes of the hand-held vacuum 15, such as a high-speed setting and a low-speed setting for the motor 1130. The fuel gauge 1145 of the hand-held vacuum 15 operates in a manner similar to the fuel gauge 865 described above with respect to the stick-type vacuum 20.

In some embodiments, the hand-held vacuum 15 is configured to provide at least 13 air Watts of power at the suction inlet 1125. The nozzle 1120 also includes a crevice/brush tool 1150 coupled to the nozzle 1120. In the illustrated embodiment, the crevice/brush tool 1150 is pivotally coupled to the nozzle 1120. When in a storage position, the crevice/brush tool 1150 is pivoted to a position clear of the suction inlet 1125 on an underside of the nozzle 1120. When in a use position, the crevice/brush tool 1150 is pivoted from the storage position such that it is substantially in front of the suction inlet 1125. In other embodiments, the crevice/brush tool 1150 is removably coupled to the nozzle 1120 or another portion of the hand-held vacuum 15. The refuse chamber 1115 is positioned between the motor 1130 and the nozzle 1120. The refuse chamber 1115 is, for example, frictionally coupled to the hand-held vacuum 15 or coupled via a latching mechanism. The refuse chamber 1115 includes an inlet (not shown) for receiving refuse from the nozzle 1120. In the illustrated embodiment, the refuse chamber 1115 is bagless. In other embodiments, the refuse chamber 1115 includes a bag or similar disposable storage accessory.

Although the battery pack 50 has been described primarily with respect to its interconnections and coupling to battery chargers, stick-type vacuums, and hand-held vacuums, the battery pack 50 is configured to be coupled to the other devices in the cleaning system 10 illustrated in FIG. 1. For example, the battery pack 50 is configured to be coupled to and power the bagless upright vacuum 25, the bagged upright vacuum 35, the carpet cleaner 40, and the canister vacuum 45. In some embodiments, one or more of the devices illustrated in FIG. 1 include a height-adjustable handle or body portion. Additionally, the specific manner and techniques for connecting the battery pack 50 to these devices is not described. However, in some embodiments, the interconnections between the battery pack 50 and the devices are similar to the interconnections described above with respect to the stick-type vacuum 20 and the hand-held vacuum 15, although specific operating parameters and characteristics vary among the devices.

In some embodiments of the invention, when the battery pack 50 is not coupled to the battery charger 30, the battery charger 30 is used to provide power to additional devices. For example, the battery charger 30 is configured to provide power to devices such as those illustrated in FIGS. 31-39. The devices include a night-light 1200, a kitchen timer 1205, a clock 1210, an audio storage device dock 1215, an air ionizer, freshener, or fan 1220, an LCD screen 1225, a USB charging station 1230, an indoor weather station 1235, and a mobile phone charger or speakerphone 1240. In other embodiments, the battery charger 30 is configured to charge additional devices. Each of the devices 1200-1240 includes terminals similar to those described above with respect to the battery pack 50 for coupling to the battery charger 30, or an adapter is provided to connect the devices 1200-1240 to the battery charger 30. In some embodiments, the battery charger 30 is configured to both power at least one of the devices 1200-1240 and charge a battery pack 50. In such embodiments, the battery charger 30 includes either a recess for receiving a battery pack 50, or the device includes an interface for electrically connecting the battery pack 50 to the battery charger 30.

Thus, the invention provides, among other things, a cordless, battery-powered system of electronic devices, such as a system of cleaning products. Each of the devices is powered by a battery pack which is interchangeable among the devices. Various features and advantages of the invention are set forth in the following claims.

What is claimed is:

1. A cordless cleaning system, comprising:
  a rechargeable battery pack having a battery pack housing and at least two cells within the housing, a first power terminal, a second power terminal, and a communication terminal;
  a first cordless cleaning device operable to selectively removably receive and be powered by the rechargeable battery pack, the first cordless cleaning device including a first battery pack recess sized to receive the rechargeable battery pack, a portion of the battery pack housing being insertable into the first battery pack recess, the first cordless cleaning device configured to receive power from the first power terminal and the second power terminal and communicatively connect to the battery pack over the communication terminal; and a second cordless cleaning device operable to selectively removably receive and be powered by the rechargeable battery pack, the second cordless cleaning device including a second battery pack recess sized to receive the rechargeable battery pack, the portion of the battery pack housing being insertable into the second battery pack recess, the second cordless cleaning device configured to receive power from the first power terminal and the second power terminal and communicatively connect to the battery pack over the communication terminal, wherein the first device is a first type of cleaning device and the second device is a second type of cleaning device, the first type being different than the second type, and wherein at least one of the first device and the second device has an upright working position.

2. The system of claim 1, wherein the battery pack is configured to operate in one of a first mode and a second mode.

3. The system of claim 2, wherein the first mode is a sleep mode.

4. The system of claim 1, further comprising a battery charger external to the first device and the second device, the battery charger operable to receive and charge the rechargeable battery pack.

5. The system of claim 4, wherein the charger is operable to receive and charge the rechargeable battery pack when the battery pack is not connected to either the first device or the second device.

6. The system of claim 1, wherein the rechargeable battery pack has a lithium-based chemistry.

7. The system of claim 1, wherein the first device is a stick or upright vacuum cleaner and the second device is a hand-held vacuum cleaner.

8. The system of claim 1, further comprising a third cordless cleaning device operable to receive and be powered by the rechargeable battery pack, wherein the third device is a third type of cleaning device, the third type being different than the first and second types.

9. The system of claim 1, wherein at least one of the first device and the second device is bagless.

10. The system of claim 1, wherein the at least one of the first device and the second device is operable in the upright working position without external support.

11. The system of claim 1, wherein a charge capacity of the rechargeable battery pack is at least approximately 10 volts.

12. The system of claim 1, wherein the first cordless cleaning device includes a suction inlet and a vacuum motor, the vacuum motor being powered by the battery pack and configured to provide a suction force at the suction inlet.

13. The system of claim 12, wherein the first cordless cleaning device includes a brush roll motor, the brush roll motor being powered by the battery pack and configured to provide rotational movement to a brush roll.

14. The system of claim 13, wherein the first cordless cleaning device is configured to operate in a first mode in which the vacuum motor is operable, and a second mode in which the brush roll motor and the vacuum motor are operable.

15. The system of claim 14, wherein the first cordless cleaning device further includes a selection device configured to select the first mode or the second mode.

16. The system of claim 12, wherein the battery pack is positioned above the vacuum motor.

17. The system of claim 12, wherein the first cordless cleaning device includes a refuse chamber.

18. The system of claim 17, wherein the battery pack is positioned above the refuse chamber.

19. The system of claim 18, wherein the battery pack is positioned above the vacuum motor.

20. The system of claim 17, wherein the battery pack is positioned above the vacuum motor, and the vacuum motor is positioned above the refuse chamber.

21. The system of claim 12, wherein the vacuum motor is a brushless direct current ("BLDC") motor.

22. The system of claim 12, wherein the first cordless cleaning device is configured to provide at least approximately 6 air Watts of power at the suction inlet.

23. The system of claim 1, wherein the first cordless cleaning device and the battery pack have a combined weight of less than approximately 7.5 pounds.

24. The system of claim 1, wherein the first cordless cleaning device includes a body portion and the battery pack is positioned along an axis of the body portion.

25. The system of claim 24, wherein the battery pack is positioned along a centerline of the body portion.

26. The system of claim 1, wherein the first cordless cleaning device is configured to communicate serially with the battery pack.

27. The system of claim 1, wherein the first cordless cleaning device receives a signal over the communication terminal related to a voltage of at least one of the at least two cells within the housing.

28. The system of claim 1, wherein the first cordless cleaning device is an upright vacuum cleaner.

29. The system of claim 1, wherein the first cordless cleaning device is a canister vacuum cleaner.

30. The system of claim 1, wherein the first cordless cleaning device is a wet/dry floor cleaner.

31. The system of claim 1, wherein the first cordless cleaning device is a carpet cleaner.

32. The system of claim 1, wherein the at least two battery cells have a lithium-based cell chemistry.

33. The system of claim 32, wherein the battery pack has a voltage between 4V and 48V.

34. The system of claim 32, wherein the battery pack is configured to provide discharge currents between approximately 7 Amps and 11 Amps.

35. The system of claim 1, wherein the second cordless cleaning device is a hand-held vacuum cleaner.

36. The system of claim 35, wherein the second cordless cleaning device includes a suction inlet and is configured to provide at least approximately 13 air Watts of power at the suction inlet.

\* \* \* \* \*